(12) United States Patent  
Kohler

(10) Patent No.: US 9,649,821 B2  
(45) Date of Patent: May 16, 2017

(54) APPARATUS FOR PRODUCING CORRUGATED BOARD

(71) Applicant: HBK Family, LLC, Uniontown, OH (US)

(72) Inventor: Herbert B. Kohler, Uniontown, OH (US)

(73) Assignee: HBK FAMILY, LLC, Uniontown, OH (US)

( * ) Notice: Subject to any disclaimer, the term of this patent is extended or adjusted under 35 U.S.C. 154(b) by 577 days.

(21) Appl. No.: 14/164,454

(22) Filed: Jan. 27, 2014

(65) Prior Publication Data

US 2014/0141113 A1    May 22, 2014

Related U.S. Application Data

(63) Continuation of application No. 12/867,535, filed as application No. PCT/US2009/037959 on Mar. 23, 2009, now Pat. No. 8,672,825.

(Continued)

(51) Int. Cl.
| | | |
|---|---|---|
| *B31F 1/22* | (2006.01) | |
| *B29C 53/26* | (2006.01) | |
| *B31F 1/32* | (2006.01) | |

(52) U.S. Cl.
CPC .................. *B31F 1/22* (2013.01); *B31F 1/32* (2013.01); *B29C 53/26* (2013.01)

(58) Field of Classification Search
CPC ...... B31F 1/22; B31F 1/36; B31F 1/32; B29C 53/26; B29C 53/265

(Continued)

(56) References Cited

U.S. PATENT DOCUMENTS

| 654,884 A | 7/1900 | Ferres et al. |
|---|---|---|
| 739,276 A | 9/1903 | Allen |

(Continued)

FOREIGN PATENT DOCUMENTS

| CA | 1072873 | 3/1980 |
|---|---|---|
| DE | 595275 | 4/1934 |

(Continued)

OTHER PUBLICATIONS

Daub, E. et al., "Gluing corrugated medium and linerboard together on the corrugator," Tappi Journal, pp. 171-178, Jun. 1990.

(Continued)

*Primary Examiner* — Stephen F Gerrity  
(74) *Attorney, Agent, or Firm* — Pearne & Gordon LLP

(57) ABSTRACT

An apparatus is provided for producing longitudinally corrugated product. The apparatus includes a guide roll for guiding a web of medium material, wherein at least a portion of the guide roll is adapted to be arranged at an angle relative to another portion of the guide roll. The apparatus further includes a plurality of flute forming bars oriented generally along a longitudinal axis of the web to define a first corrugating labyrinth effective to longitudinally corrugate the web to an intermediate geometry. The apparatus further includes a pair of corrugating rollers that cooperate to define, at a nip therebetween, a second corrugating labyrinth effective to longitudinally corrugate the web to a substantially final geometry. The apparatus further includes a web travel pathway for the web that follows a path around a portion of the guide roll, through the first corrugating labyrinth, and through the second corrugating labyrinth.

26 Claims, 14 Drawing Sheets

Related U.S. Application Data

(60) Provisional application No. 61/038,513, filed on Mar. 21, 2008.

(58) Field of Classification Search
USPC .................. 493/463, 427, 434, 440, 465; 156/461–463, 200, 210; 425/336
IPC .................................. B31F 1/22; B29C 53/26
See application file for complete search history.

(56) References Cited

U.S. PATENT DOCUMENTS

| | | |
|---|---|---|
| 1,199,508 A | 9/1916 | Swift, Jr. |
| 1,627,966 A | 5/1927 | Goodlett |
| 1,834,648 A | 12/1931 | Saunders |
| 1,848,583 A | 3/1932 | Swift, Jr. |
| 1,981,338 A | 11/1934 | Swift, Jr |
| RE20,970 E | 1/1939 | Rowe et al. |
| 2,163,063 A * | 6/1939 | Romanoff ................ B31F 1/22 425/336 |
| 2,236,932 A | 4/1941 | Arentsen |
| 2,257,429 A | 9/1941 | Ruegenberg |
| 2,398,844 A | 4/1946 | Muggleton et al. |
| 2,494,431 A | 1/1950 | Eckstein |
| 2,622,558 A | 12/1952 | Mikkelsen |
| 2,793,676 A | 5/1957 | Hubmeier |
| 2,960,145 A | 11/1960 | Ruegenberg |
| 3,002,876 A | 10/1961 | Rosati |
| 3,024,496 A | 3/1962 | Colombo |
| 3,026,231 A | 3/1962 | Chavannes |
| 3,046,935 A | 7/1962 | Wilson |
| 3,077,222 A | 2/1963 | Shanley |
| 3,178,494 A | 4/1965 | Tisdale |
| 3,245,121 A | 4/1966 | Graff |
| 3,300,359 A | 1/1967 | Nikkel |
| 3,303,814 A | 2/1967 | Nitchie |
| 3,306,805 A | 2/1967 | Klein et al. |
| 3,383,234 A | 5/1968 | Nikkel |
| 3,425,888 A | 2/1969 | Kellicutt |
| 3,479,240 A | 11/1969 | Moser |
| 3,560,310 A | 2/1971 | Bolton |
| 3,648,913 A | 3/1972 | Ferara |
| 3,676,247 A | 7/1972 | Morris et al. |
| 3,676,263 A | 7/1972 | Tisdale |
| 3,700,518 A | 10/1972 | Ohmori |
| 3,738,905 A | 6/1973 | Thomas |
| 3,773,587 A | 11/1973 | Flewwelling |
| 3,788,515 A | 1/1974 | Middleman |
| 3,892,613 A | 7/1975 | McDonald et al. |
| 3,966,518 A | 6/1976 | Ferara et al. |
| 3,981,758 A | 9/1976 | Thayer et al. |
| 3,993,425 A | 11/1976 | Dunn et al. |
| 4,086,116 A | 4/1978 | Yazaki et al. |
| 4,104,107 A | 8/1978 | Christensen |
| 4,128,677 A | 12/1978 | Hoelzinger |
| 4,134,781 A | 1/1979 | Carstens et al. |
| 4,155,884 A | 5/1979 | Hughes |
| 4,177,102 A | 12/1979 | Tokuno |
| 4,179,253 A | 12/1979 | Lightfoot |
| 4,267,008 A | 5/1981 | Owens |
| 4,282,998 A | 8/1981 | Peekna |
| 4,306,932 A | 12/1981 | Bradatsch et al. |
| 4,316,428 A | 2/1982 | Flaum et al. |
| 4,316,755 A | 2/1982 | Flaum et al. |
| 4,338,154 A | 7/1982 | Berthelot et al. |
| 4,344,379 A | 8/1982 | Roberts |
| 4,351,264 A | 9/1982 | Flaum et al. |
| 4,453,465 A | 6/1984 | Heller et al. |
| 4,498,949 A | 2/1985 | Soennichsen |
| 4,544,436 A | 10/1985 | Itoh et al. |
| 4,569,864 A | 2/1986 | McIntyre |
| 4,589,944 A | 5/1986 | Torti et al. |
| 4,603,654 A | 8/1986 | Mori et al. |
| 4,757,782 A | 7/1988 | Pullinen |
| 4,764,236 A | 8/1988 | Nikkel |
| 4,806,183 A | 2/1989 | Williams |
| 4,841,317 A | 6/1989 | Westell |
| 4,863,087 A | 9/1989 | Kohler |
| 4,871,593 A | 10/1989 | McIntyre |
| 4,879,949 A | 11/1989 | Vennike |
| 4,886,563 A | 12/1989 | Bennett et al. |
| 4,935,082 A | 6/1990 | Bennett et al. |
| 4,991,787 A | 2/1991 | Berg |
| 5,016,801 A | 5/1991 | Gilat et al. |
| 5,037,665 A | 8/1991 | LaMantia et al. |
| 5,048,453 A | 9/1991 | Eriksson |
| 5,103,732 A | 4/1992 | Wells et al. |
| 5,185,052 A | 2/1993 | Chappell et al. |
| 5,203,935 A | 4/1993 | May et al. |
| 5,226,577 A | 7/1993 | Kohler |
| 5,242,525 A | 9/1993 | Biagiotti |
| 5,246,497 A | 9/1993 | Rantanen |
| 5,275,657 A | 1/1994 | Duffy et al. |
| 5,362,346 A | 11/1994 | Bullock, Sr. |
| 5,423,468 A | 6/1995 | Liedtke |
| 5,503,547 A | 4/1996 | Funahashi et al. |
| 5,508,083 A | 4/1996 | Chapman, Jr. |
| 5,609,293 A | 3/1997 | Wu et al. |
| 5,656,124 A | 8/1997 | Krayenhagen et al. |
| 5,660,631 A | 8/1997 | Eriksson |
| 5,783,006 A | 7/1998 | Klockenkemper et al. |
| 5,785,802 A | 7/1998 | Seki et al. |
| 5,792,487 A | 8/1998 | Wenning et al. |
| 5,947,885 A | 9/1999 | Paterson |
| 6,051,068 A | 4/2000 | Kohl et al. |
| 6,058,844 A | 5/2000 | Niemiec |
| 6,068,701 A | 5/2000 | Kohler et al. |
| 6,098,687 A | 8/2000 | Ishibuchi et al. |
| 6,126,750 A | 10/2000 | Seiz et al. |
| 6,136,417 A | 10/2000 | Ishibuchi et al. |
| 6,143,113 A | 11/2000 | Berube |
| 6,155,319 A | 12/2000 | Giugliano et al. |
| 6,257,520 B1 | 7/2001 | Fujikura |
| 6,364,247 B1 | 4/2002 | Polkinghorne |
| 6,418,851 B1 | 7/2002 | Hartmann et al. |
| 6,470,294 B1 | 10/2002 | Taylor |
| 6,575,399 B1 | 6/2003 | Lamothe |
| 6,595,465 B2 | 7/2003 | Lamothe |
| 6,602,546 B1 | 8/2003 | Kohler |
| 6,620,240 B2 | 9/2003 | Choi et al. |
| 6,620,455 B2 | 9/2003 | Mensing et al. |
| 6,635,111 B1 | 10/2003 | Holtmann et al. |
| 6,692,602 B1 | 2/2004 | Mensing et al. |
| 6,800,052 B1 | 10/2004 | Abe |
| 7,115,089 B2 | 10/2006 | Basily et al. |
| 7,267,153 B2 | 9/2007 | Kohler |
| 7,595,086 B2 | 9/2009 | Kohler |
| 7,691,045 B2 | 4/2010 | Basily et al. |
| 7,717,148 B2 | 5/2010 | Kohler |
| 7,740,786 B2 * | 6/2010 | Gerndt et al. ............ B31F 1/22 425/336 |
| 7,758,487 B2 | 7/2010 | Elsayed et al. |
| 8,672,825 B2 * | 3/2014 | Kohler .................... B31F 1/22 156/462 |
| 2002/0149866 A1 | 10/2002 | Kato et al. |
| 2003/0178524 A1 | 9/2003 | Newman et al. |
| 2003/0192902 A1 | 10/2003 | Sosalla et al. |
| 2004/0241328 A1 | 12/2004 | Bradatsch et al. |
| 2005/0006816 A1 | 1/2005 | Drut et al. |
| 2005/0194088 A1 | 9/2005 | Kohler |
| 2006/0225830 A1 | 10/2006 | Kohler |
| 2007/0138698 A1 | 6/2007 | Gerndt et al. |
| 2008/0317940 A1 | 12/2008 | Kohler |
| 2009/0291817 A1 | 11/2009 | Basily et al. |
| 2009/0325772 A1 | 12/2009 | Basily et al. |
| 2010/0181015 A1 | 7/2010 | Kohler |

FOREIGN PATENT DOCUMENTS

| | | |
|---|---|---|
| DE | 4018426 | 12/1991 |
| EP | 0037332 | 10/1981 |
| EP | 1199151 A2 | 4/2002 |
| EP | 1199152 A2 | 4/2002 |
| EP | 0825017 B1 | 7/2002 |

(56) References Cited

FOREIGN PATENT DOCUMENTS

| | | | | |
|---|---|---|---|---|
| GB | 199538 A | 1/1923 | | |
| GB | 1544634 | 4/1979 | | |
| GB | 2039559 | 8/1980 | | |
| JP | S40-023188 | 8/1965 | | |
| JP | S42-004916 B | 2/1967 | | |
| JP | S48-29595 A | 4/1973 | | |
| JP | S48-21676 B1 | 6/1973 | | |
| JP | 52148396 | 12/1977 | | |
| JP | S52-156090 A | 12/1977 | | |
| JP | S53-010833 U | 1/1978 | | |
| JP | S56-160832 | 11/1981 | | |
| JP | H01-228572 | 9/1989 | | |
| JP | H10-034776 | 2/1998 | | |
| JP | 2000-202930 | 7/2000 | | |
| JP | 2001-063918 | 3/2001 | | |
| JP | 2002-192637 | 7/2002 | | |
| JP | 2005-193504 | 7/2005 | | |
| RU | 1805605 A1 | 7/1996 | | |
| RU | 2118217 C1 | 8/1998 | | |
| SU | 1468766 A1 * | 3/1989 | ............... | B31F 1/22 |
| WO | WO 9947347 A1 * | 9/1999 | ............... | B31F 1/22 |
| WO | 02/44635 A2 | 6/2002 | | |

OTHER PUBLICATIONS

Eltex Elektrostatik GmbH, "Webmoister 70RX" presentation, 24 pages.

Inoue, M. et al., "Kinetics of gelatinization of cornstarch adhesive," J. Applied Polymer Sci., vol. 31, pp. 2779-2789, 1986.

Institute of Paper Chemistry, "Development of a Cold Corrugating Process," Contract No. DE-AC02-79CS40211, Appleton, WI, Dec. 15, 1981, 130 pages.

Janes, R.L., "A Study of Adhesion in the Cellulose-Starch-Cellulose System," Institute of Paper Chemistry, Appleton, WI, Jun. 1968, 207 pages.

Kroeschell, W.O., "Bonding on the corrugator," Tappi Journal, pp. 69-74, Feb. 1990.

Ononokpono, O.E. et al., "The influence of binder film thickness on the mechanical properties of binder films in tension," J. Pharm Pharmacol, pp. 126-128, Feb. 1988.

Printco Industries, LLC, "Chambered Reverse Angle Doctor Blade System," retrieved from www.printco-industries.com on Sep. 25, 2009, 1 page.

Sprague, C.H., "Development of a Cold Corrugating Process Final Report," Institute of Paper Chemistry, Appleton, WI, May 1985, 339 pages.

Whitsitt, W.J. et al., "High Speed Runnability and Bonding: Effects of Medium and Corrugator Conditions on Board Quality," Institute of Paper Chemistry, Appleton, WI, May 1, 1989, 77 pages.

Page from a brochure for the Marquip Pyrobond Singlefacer, "The shortest distance to flute formation provides better runnability of all papers.", 1 page.

International Search Report and Written Opinion from corresponding PCT Application Serial No. PCT/US2009/037959, mailed Aug. 31, 2009, 12 pages.

Shaw, N.W. et al., "Xitex—A revolution in board design and manufacture," Tappi Journal 1997 Corrugated Containers Conference Proceedings, 12 pages.

Office of Industrial Technologies, Energy Efficiency and Renewable Energy, U.S. Department of Energy, "Forest Products Project Fact Sheet—Linear Corrugating," Order #1-FP-723, Jan. 2002, 2 pages.

English translation of Notice of Reasons for Rejection issued Jun. 4, 2013 in corresponding Japanese Patent Application No. 2011-501011, 3 pages.

Extended European search report issued in related European Patent Application No. EP 09 72 1657, dated Aug. 4, 2015.

* cited by examiner

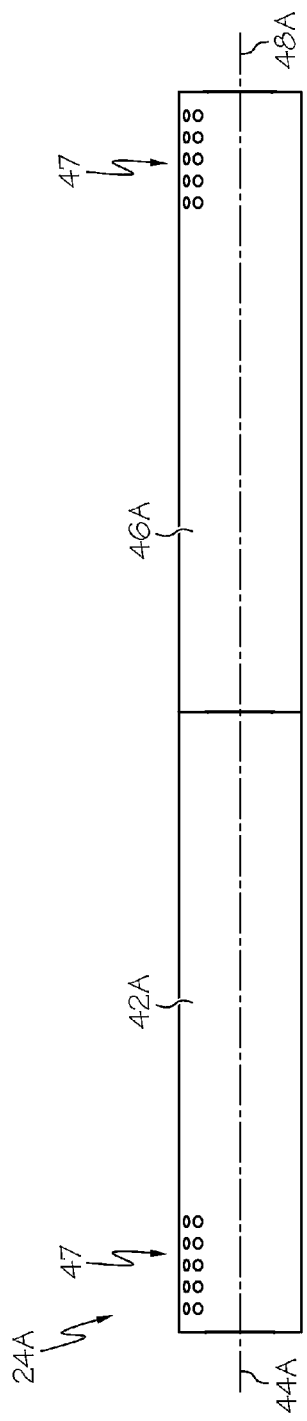
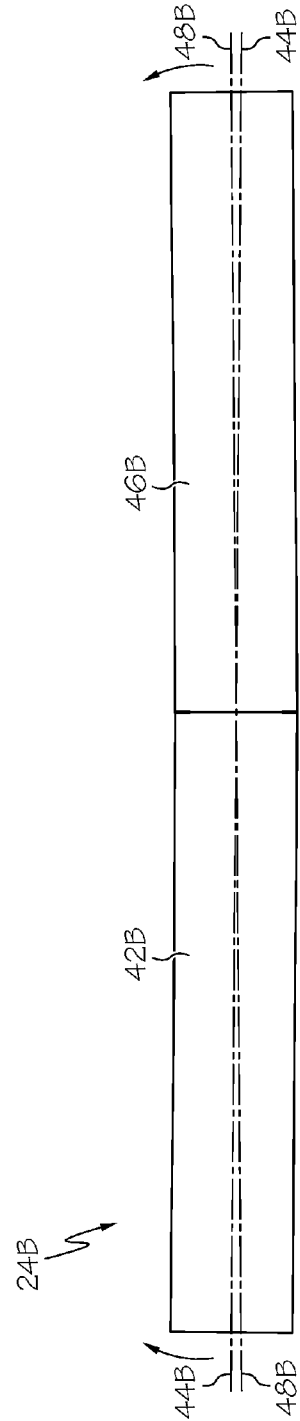
FIG. 3A
FIG. 3B

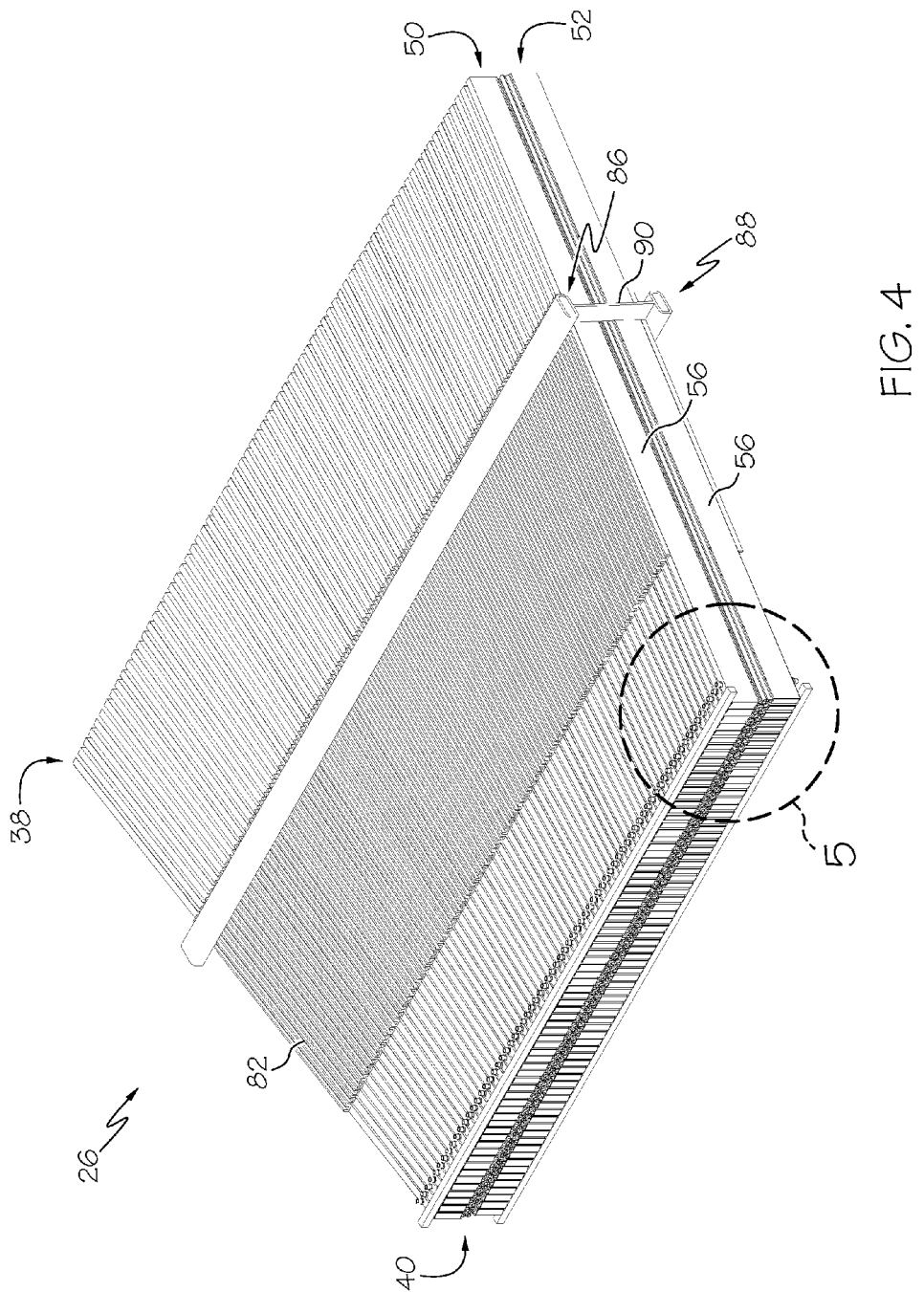

APPARATUS FOR PRODUCING CORRUGATED BOARD

CROSS-REFERENCE TO RELATED APPLICATIONS

This application is a continuation of U.S. patent application Ser. No. 12/867,535 filed Aug. 13, 2010, which is a national stage filing of PCT Application No. PCT/US09/37959 filed Mar. 23, 2009, which claims the benefit of U.S. Provisional Application No. 61/038,513 filed Mar. 21, 2008, the entire disclosures of which are hereby incorporated herein by reference.

FIELD OF THE INVENTION

The present invention relates generally to the production of corrugated cardboard, and more particularly, to the production of longitudinally corrugated cardboard.

BACKGROUND OF THE INVENTION

Corrugated cardboard composite is used in a large number of applications. It is particularly desirable in packaging applications because it is rugged and has high dimensional and structural integrity. Corrugated boxes are used to package a variety of goods and are commonly stacked upon one another. The boxes must have sufficient stacking strength to maintain their shape while supporting the stacked corrugated boxes with goods stored therein. Therefore, corrugated boxes are commonly constructed so as to utilize the strength of corrugated board. Corrugated board typically includes a corrugated medium affixed to at least one liner, or alternatively, sandwiched between a top liner and a bottom liner. Corrugated boxes constructed from corrugated board, with the flutes oriented vertically, generally have sufficient stacking strength.

Typically, corrugated cardboard is formed by producing a corrugated sheet that is initially bonded along one side to a single face. Adhesive is then applied to the crests of the flutes remote from the single face by an applicator roll of a glue machine. Thereafter, a second face is applied to the adhesive on the flutes to produce a composite structure in which corrugations extend between and are bonded to spaced-apart faces.

In some instances, multiple-layer cardboard is produced in which more than one corrugated sheet is adhesively attached to additional faces so that, for example, a central flat face is bonded to a corrugated sheet on each side thereof, and outer flat faces are bonded to the sides of the two corrugated sheets remote from the central face. In another example, the flutes of one corrugated sheet can be adhesively attached to the flutes of another corrugated sheet.

Typically, a single face liner is a planar piece of paperboard while the corrugated medium is a fluted piece of paperboard. Conventionally, the corrugated medium is formed from a generally planar paperboard web that is maintained under a tensile force and is continuously fed into a corrugating machine that forms the flutes. The planar paperboard web is generally fed into the corrugating machine with the paperboard fibers oriented in a longitudinal direction generally parallel to the web direction. However, conventional corrugating machines generally form the flutes in a transverse direction relative to the longitudinal direction of the paperboard web. In other words, the flutes are formed in a "non-machine-direction" that is transverse to the fibers of the paperboard. The "machine direction" is defined by the direction in which fibers pass through the paper machine. Thus, flutes formed in a "non-machine direction" must re-orient the paper fibers, which can lead to reduced strength.

Accordingly, it would be beneficial to provide a corrugating machine that can form the flutes in the paperboard in the "machine direction" and generally parallel to the direction of the paper fibers (e.g., linear or longitudinal fluting). Flutes formed longitudinally in the "machine direction" can provide a significant strength increase in the resulting corrugated board. Moreover, it would be beneficial to provide a corrugating machine that can permit relatively quick adjustment of the flute sizes to provide various types of corrugated board.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, an apparatus for producing a longitudinally corrugated product is provided. The apparatus includes a guide roll for guiding a web of medium material, wherein at least a portion of the guide roll is adapted to be arranged at an angle relative to another portion of the guide roll such that a path length of an edge portion of the web is shortened relative to a path length of a center portion of the web after leaving the guide roll. The apparatus further includes a plurality of flute forming bars oriented generally along a longitudinal axis of the web to define a first corrugating labyrinth effective to longitudinally corrugate, to an intermediate geometry, the web of medium material that is drawn therethrough. The apparatus further includes a pair of corrugating rollers that cooperate to define, at a nip therebetween, a second corrugating labyrinth between respective and interlocking pluralities of corrugating teeth provided on the corrugating rollers. The pluralities of corrugating teeth are arranged cylindrically along each of the rollers, wherein said interlocking pluralities of corrugating teeth are effective to longitudinally corrugate, to a substantially final geometry, the web of medium material that is drawn through said nip on rotation of the corrugating rollers. The apparatus further includes a web travel pathway for the medium material that follows a path around a portion of an outer circumferential surface of the guide roll, through the first corrugating labyrinth, and through the second corrugating labyrinth.

In accordance with another aspect of the present invention, an apparatus for producing a longitudinally corrugated product. The apparatus includes a guide roll for guiding a web of medium material, wherein at least a portion of the guide roll is adapted to be arranged at an angle relative to another portion of the guide roll such that an edge portion of the web is moved relatively closer to a web centerline after leaving the guide roll to thereby shorten a path length of the edge portion. The apparatus further includes a plurality of flute forming bars oriented generally along a longitudinal axis of the web, including an upper set of flute forming bars disposed above the web of medium material and a lower set of flute forming bars disposed below the web of medium material. The upper and lower sets of flute forming bars are interdigitated so as to define a first corrugating labyrinth effective to longitudinally corrugate, to an intermediate geometry, the web of medium material that is drawn therethrough. The flute forming bars are pivotable to individually adjust an angle of each of the flute forming bars relative to the centerline of the web to thereby form a fan of adjustable width. The apparatus further includes a pair of corrugating rollers that cooperate to define, at a nip therebetween, a second corrugating labyrinth between respective and interlocking pluralities of corrugating teeth provided on the corrugating rollers. The pluralities of corrugating teeth are arranged cylindrically along each of the rollers, wherein said interlocking pluralities of corrugating teeth are effective to longitudinally corrugate, to a substantially final geometry, the web of medium material that is drawn through said nip on rotation of the corrugating rollers. The apparatus further includes a web travel pathway for the medium material that follows a path around a portion of an outer circumferential surface of the guide roll, through the first corrugating labyrinth, and through the second corrugating labyrinth.

In accordance with another aspect of the present invention, an apparatus for producing a longitudinally corrugated product. The apparatus includes a guide roll for guiding a web of medium material defining first width, wherein at least a portion of the guide roll is adapted to be arranged at an angle relative to another portion of the guide roll such that the width of the web is reduced to a second width after leaving the guide roll. The apparatus further includes a plurality of flute forming bars oriented generally along a longitudinal axis of the web, including an upper set of flute forming bars disposed above the web of medium material and a lower set of flute forming bars disposed below the web of medium material. The upper and lower sets of flute forming bars are interdigitated so as to define a first corrugating labyrinth effective to longitudinally corrugate, to an intermediate geometry, the web of medium material that is drawn therethrough. The flute forming bars are pivotally coupled, at an exit end thereof, to a support frame such that the flute forming bars are movable laterally, at an entrance end thereof, to individually adjust an angle of each of the flute forming bars relative to the centerline of the web to thereby form a fan of adjustable width adapted to be substantially equal to, at the entrance end, the second width. The apparatus further includes a pair of corrugating rollers that cooperate to define, at a nip therebetween, a second corrugating labyrinth between respective and interlocking pluralities of corrugating teeth provided on the corrugating rollers. The pluralities of corrugating teeth are arranged cylindrically along each of the rollers, wherein said interlocking pluralities of corrugating teeth are effective to longitudinally corrugate, to a substantially final geometry, the web of medium material that is drawn through said nip on rotation of the corrugating rollers. The apparatus further includes a web travel pathway for the medium material that follows a path around a portion of an outer circumferential surface of the guide roll, through the first corrugating labyrinth, and through the second corrugating labyrinth.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 3A is a top view of an example guide roll;

FIG. 3B is an alternate arrangement of the guide roll of FIG. 3A;

FIG. 4 is a perspective view of an example segmented forming device;

DESCRIPTION OF EXAMPLE EMBODIMENTS

Figure 1:
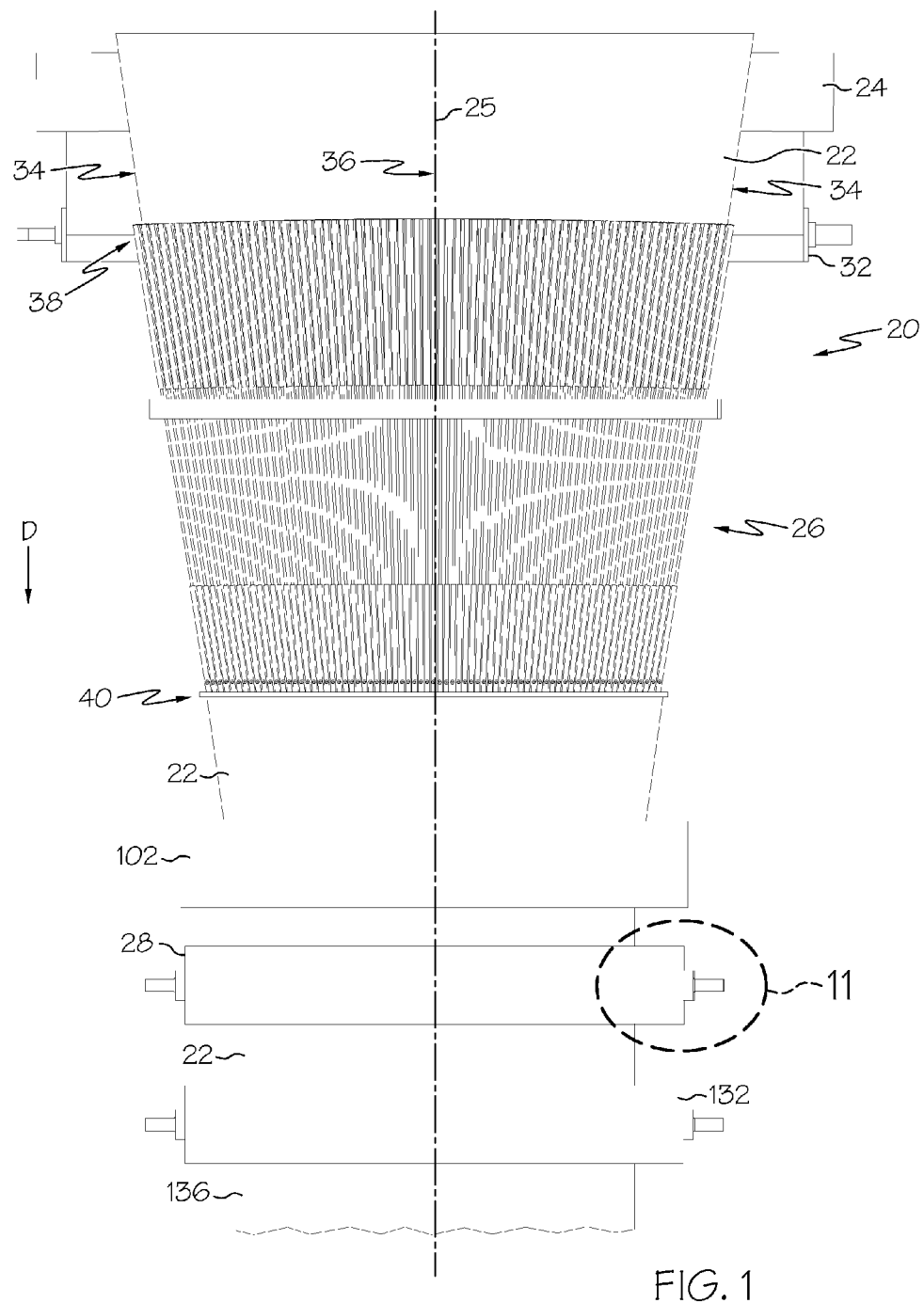
FIG. 1 is a top view of the apparatus for producing a longitudinally corrugated product according to aspects of the present application.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

As used herein, the term "web" refers to a sheet of material traveling through the apparatus, and particularly as it travels through various corrugating labyrinths as will be further described. Also as used herein, the terms "glue" and "adhesive" are used interchangeably, and refer to the adhesive that is applied to the flute crests of a corrugated sheet as hereinafter described. Any glue applied to any portion of the web can be applied using various methods known by one of skill in the art.

Herein, all apparatus elements or members are considered to be rigid, substantially inelastic elements or members under the forces encountered thereby. All such elements or members can be made using conventional materials in a conventional manner as will be apparent to persons of ordinary skill in the art based on the present disclosure. Further, the apparatus can include various other elements or can even be a part of a larger manufacturing operation known to one of skill in the art, such as described in U.S. Pat. Nos. 6,068,701, 6,602,546, and 7,267,153, the contents of which are incorporated herein by reference in their entirety.

Figure 2:
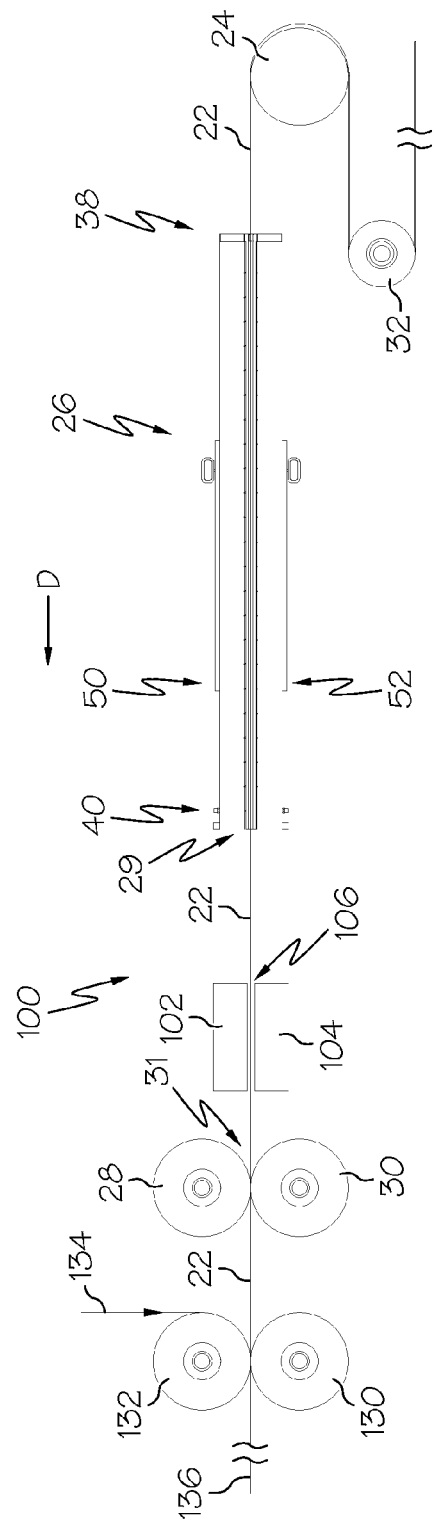
FIG. 2 is a side view of the apparatus of FIG. 1.

Turning to the shown example of FIGS. 1-2, an example apparatus 20 for producing longitudinally corrugated board is shown. It should be understood that the illustrated apparatus 20 is shown only by way of example and that the present application can be applied to many different types of machines. As discussed herein, the corrugated medium 22 is paperboard that includes a plurality of fibers. A majority of the fibers define an elongated shape and are oriented in a generally parallel fashion. The direction in which the majority of the fibers are oriented defines the machine direction "D" of the corrugated medium 22. Herein, the "machine direction" is defined by the direction in which fibers pass through the paper machine. Likewise, the "non-machine-direction" is defined as the direction transverse to the "machine direction" (i.e., transverse to the fibers of the paperboard). As will be described more fully herein, the flutes produced by the apparatus 20 are formed generally parallel to the machine direction "D". Likewise, a face sheet (not shown) or the like applied to the flutes can be paperboard and be similarly applied a direction that is substantially parallel to the machine direction "D" of the corrugated medium 22. For brevity, the formed flute geometry is not illustrated in FIG. 1.

The apparatus 20 generally includes a guide roll 24 for guiding the web of medium material (i.e., paperboard), a segmented forming device including plurality of flute forming bars 26 that define a first corrugating labyrinth 29 (see FIG. 5), and a pair of corrugating rollers 28, 30 that define a second corrugating labyrinth 31. One example web travel pathway for the medium material 22 follows a path around a portion of an outer circumferential surface of the guide roll 24, through the first corrugating labyrinth 29 of the flute forming bars 26, and through the second corrugating labyrinth of the pair of corrugating rollers 28, 30. Still, the elements can be arranged variously to alter the web travel pathway, and more or less elements can be utilized.

For example, as shown, the guide roll 24 can be preceded by various elements, such as one or more idler rollers 32 or the like adapted to carry the web 22 onto the guide roller 24. In the shown example, the idler roller 32 can be an fluid flotation idler roller 32 that can use a cushion of fluid, such as air or steam, to reduce, such as eliminate, friction between the web 22 and the idler roller 32.

The guide roll 24 can be adapted to carry the web 22 into the flute forming bars 26 to longitudinally corrugate the web 22. A portion of the guide roll 24 can be adapted to be arranged at an angle relative to another portion of the guide roll 24 such that a path length of an edge portion 34 of the web 22 is shortened relative to a path length of a center portion 36 of the web after leaving the guide roll 24. A longitudinally-directed tension is applied to the web 22 to draw the web 22 through the apparatus 20, such as by operation of one or more of the rollers 24, 28, 30, 32, etc. It can be desirable to apply the tension generally constantly across the width of the web 22 to avoid damage to the web 22. For example, stressing the web 22 differently (i.e., non-uniformly) in the non-machine direction (i.e., transversely) can cause damage to the paper fibers, wrinkling, buckling, and/or can otherwise stress the paper fibers and reduce the strength thereof.

However, because the web 22 is to be linearly corrugated via the formation of longitudinally oriented flutes, an overall width of the web 22 will gradually decrease from an initial non-corrugated width. For example, as shown in FIG. 1, a width of the web 22 will gradually decrease as it passes through the longitudinal forming bars 26 from an entrance end 38 to an exit end 40 thereof. Thus, to facilitate application of the tension generally constantly across the width of the web 22 in the non-machine direction, it can be beneficial to adjust a portion of the web 22 relative to another portion of the web 22 such that a path length thereof, between the guide roll 24 and the entrance end 38 of the longitudinal forming bars 26, is substantially equal. Where the path lengths of each portion of the web 22 are substantially equal, the tension across the web 22 should be generally constant.

Thus, for example, an outer portion of the guide roll 24 can be adapted to be arranged at an angle relative to a central portion of the guide roll 24 such that the path length of an edge portion 34 of the web 22 is shortened relative to a path length of a center portion 36 of the web after leaving the guide roll 24. The angle of the outer portion of the guide roll 24, relative to the central portion, can be chosen such that the path length of the web of the edge portion 34 is substantially equal to the path length of the center portion 36 of the web after leaving the guide roll 24. Thus, the web 22 can have a first width upon encountering the guide roll 24 that is thereby reduced to a second width after leaving the guide roll 24.

The guide roll 24 can include at least one element, such as a bowed or curved roll (i.e., a banana roll or the like, not shown) such that one portion of the guide roll 24 is arranged at an angle relative to another portion of the guide roll. The single guide roll 24 can be a fixed unitary body, or can even include one portion adjustably movable relative to another portion. In another example, as shown in FIGS. 3A-3B, the guide roll 24A can include at least a first segment 42A defining a first longitudinal axis 44A coupled to an end of a second segment 46A defining a second longitudinal axis 48A. In FIG. 3A, the first axis 44A is substantially coaxial with the second axis 48A. The first and second segments 42A, 46A can be pivotally coupled to each other at their respective ends such that the guide roll 24A can be pivoted at the center. As shown in FIG. 3B, at least one of the first and second segments 42B, 46B can be movable relative to the other of the first and second segments 42B, 46B such that the first axis 44B is oriented at an angle relative to the second axis 48B. Each of the first and second segments 42B, 46B can be movable relative to each other, with the first axis 44B being pivotable to a first angle relative to the centerline of the web and the second axis 48B being pivotable to a second angle substantially equal and opposite the first angle.

The ends of each segment 42B, 46B can be geared together so that the pivot angle of the drive side of the bar segment is duplicated by the operator side. For example, if the drive side of the guide roll is pivoted 0.5 degrees toward the flute forming bars 26 (i.e., towards the downstream end), the operator side is also pivoted 0.5 degrees toward the flute forming bars 26. Similarly, if the drive side of the guide roll is pivoted 0.5 degrees away from the flute forming bars 26, the operator side is also pivoted 0.5 degrees away from the fixed flute forming bars 26.

Thus, the multi-segment guide roll 24 can take the edge 34 of the web and direct it at a slight angle to thereby change the length of the edge 34 of the web. Thus, when the web arrives at the flute forming bars 26, the web edge 34 will be properly positioned and tensioned without excessively straining the web 22. There can be many variables, such as bar diameter, sheet width, and/or the distance from the flute forming bars 26 to a downstream element, such as the corrugating rollers 28, 30, that can determine the angle of the guide roll 24. For the instant example, the bar angle can be 0.9 degrees relative to the web 22, though other values can also be used. Thus, after wrapping the paperboard web around a portion of the guide roll 24, such as 180 degrees, the paperboard web departs toward the flute forming bars 26 at an angle of approximately 1.8 degrees (i.e., 2×0.9 degrees). As a result, the edges 34 of the paperboard web 22 are relatively closer to the corrugating rollers 28, 30 than the center 36 as the paperboard web 22 leaves the guide roll 24 to provide proper edge tension for flute formation.

In addition or alternatively, the guide roll 24 can be a zero-contact roll being operable to support the web of medium material at a variable height above its outer circumferential surface on a cushion of fluid (i.e., air or steam) that is emitted through openings 47 provided over and through the outer circumferential surface of the guide roll 24. Various numbers of openings 47 can be arranged variously, and are illustrated schematically. Either or both of the segments 42A, 46A can include the openings for the fluid. The air cushion reduces, such as eliminates, sliding friction. In addition or alternatively, the multi-segment guide roll 24 can act as a web storage device to make up for web path length changes caused by manufacturing tolerances or the like.

The zero-contact roll described can be a stationary roll that does not rotate as the web of medium material traverses its circumferential surface. Instead, a volumetric flowrate of air at a controlled pressure is pumped from within the roll 24 radially outward through small openings or holes provided periodically and uniformly over and through the outer circumferential wall of the roll. The result is that the passing web of medium material 22 is supported above the circumferential surface of the zero-contact roll 24 by a cushion of air. The necessary pressure of air to support the passing web of medium material 22 above the zero-contact roll 24 surface is governed by the equation: $P=T/R$ where P is the required air pressure (in psi), T is the tension (mean tension) in the traveling medium material web (in pounds per lineal inch or 'pli'), and R is the radius of the zero-contact roll 24 (in inches).

The nominal height above the circumferential surface of the roll 24 for the traveling web 22 is proportional to the volumetric flowrate of the air that is flowing through the openings in the circumferential surface. In a desirable mode of operation, the air volumetric flowrate is selected to achieve a nominal height for the web 22 (also corresponding to the height of the air cushion) of, e.g., 0.2-0.5 inch above the circumferential surface of the roll 24 depending on its radius, which is typically 4-6 inches. Alternatively, the flowrate can be selected to achieve a lower nominal height, for example 0.025-0.1 inches off the circumferential surface of the roll 24.

In addition or alternatively, the zero-contact roll 24 can also provide an elegant mechanism for providing feedback control for the mean web tension. For example, an active or passive pressure transducer (not shown) can be used to detect the pressure in the air cushion that is supporting the web 22 over the surface of the zero-contact roll 24. Because air cushion pressure and web tension are related according to the relation $P=T/R$ as noted above, monitoring the air cushion pressure, P, provides a real-time measure of the tension in the web 22. For example, if the radius of the roll 24 is fixed at 6 inches, and the air cushion pressure is measured at 0.66 psi, then one knows the tension in the web at that moment is 4 pli. As will be apparent, the real-time web tension data that can be inferred from measuring the pressure of the air cushion can be used in a feedback control loop to regulate the operation of the apparatus 20.

Herein, "zero-contact roll" refers to a roll having the above structure, adapted to support a web of material passing over the roll on a cushion of fluid, such as air, that is emitted through holes or openings provided over and through the outer circumferential surface of the roll. It is not meant to imply there can never be any contact (i.e. literally "zero" contact) between the zero-contact roll and the web. Such contact may occur, for example, due to transient or momentary fluctuations in mean web tension.

Moving downstream, the plurality of flute forming bars 26 define a segmented forming device. The plurality of flute forming bars 26 are oriented generally along a longitudinal axis of the web 22 to define a first corrugating labyrinth 29 effective to longitudinally corrugate, to an intermediate geometry, the web of medium material that is drawn therethrough. That is, while the plurality of flute forming bars 26 do corrugate the web medium, another downstream structure can finalize the corrugation geometry, such as the corrugating rolls 28, 30. Still, it is possible to utilize the flute forming bars 26 to produce the finalized corrugation geometry.

Figure 5:
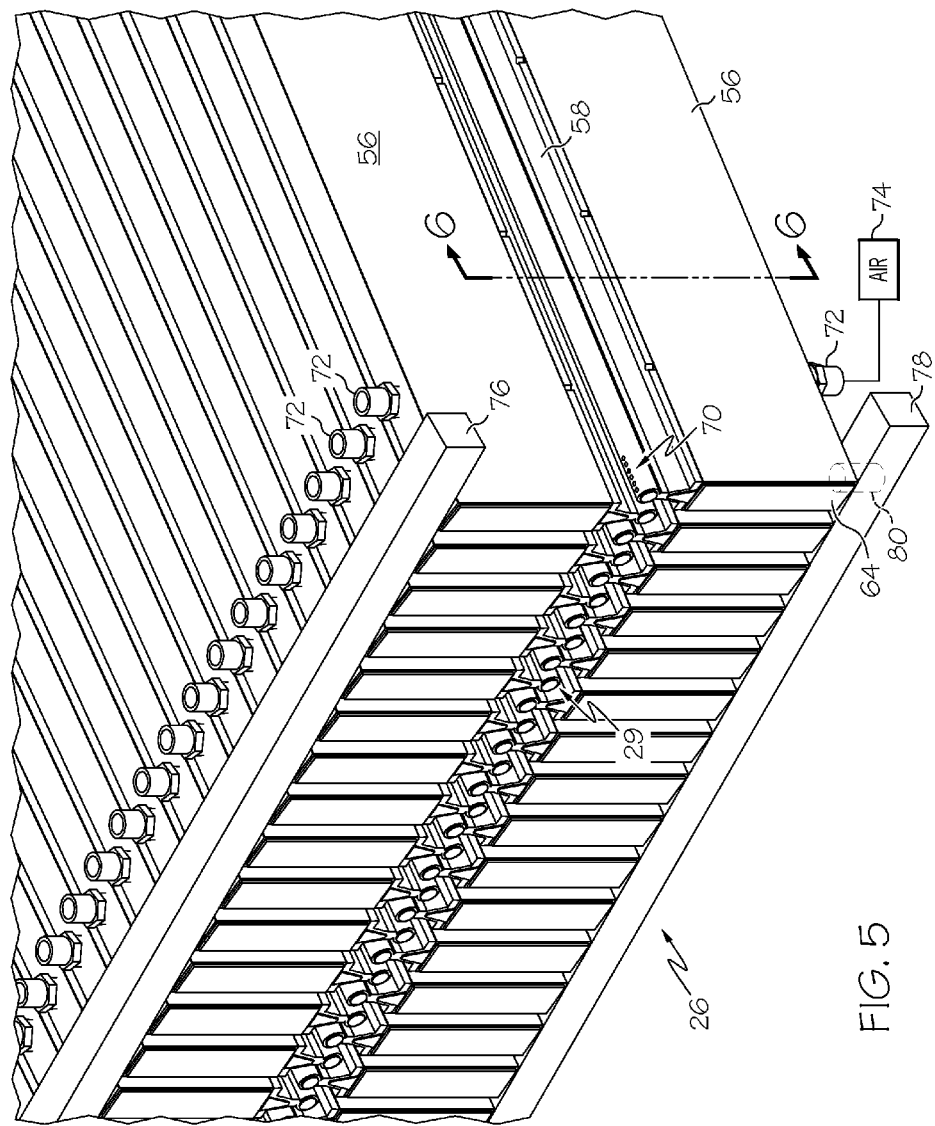
FIG. 5 is a partial detail view of an example plurality of flute forming bars of the segmented forming device of FIG. 4.

In the shown example, the segmented forming device includes two sets of relatively small forming bars that can be pivotally mounted in a frame. The plurality of flute forming bars 26 include an upper set 50 of flute forming bars disposed above the web of medium material 22, and a lower set 52 of flute forming bars disposed below the web of medium material 22. As shown in FIGS. 4-5, the upper and lower sets 50, 52 of flute forming bars can be interdigitated so as to define the first corrugating labyrinth 29.

Figure 6:
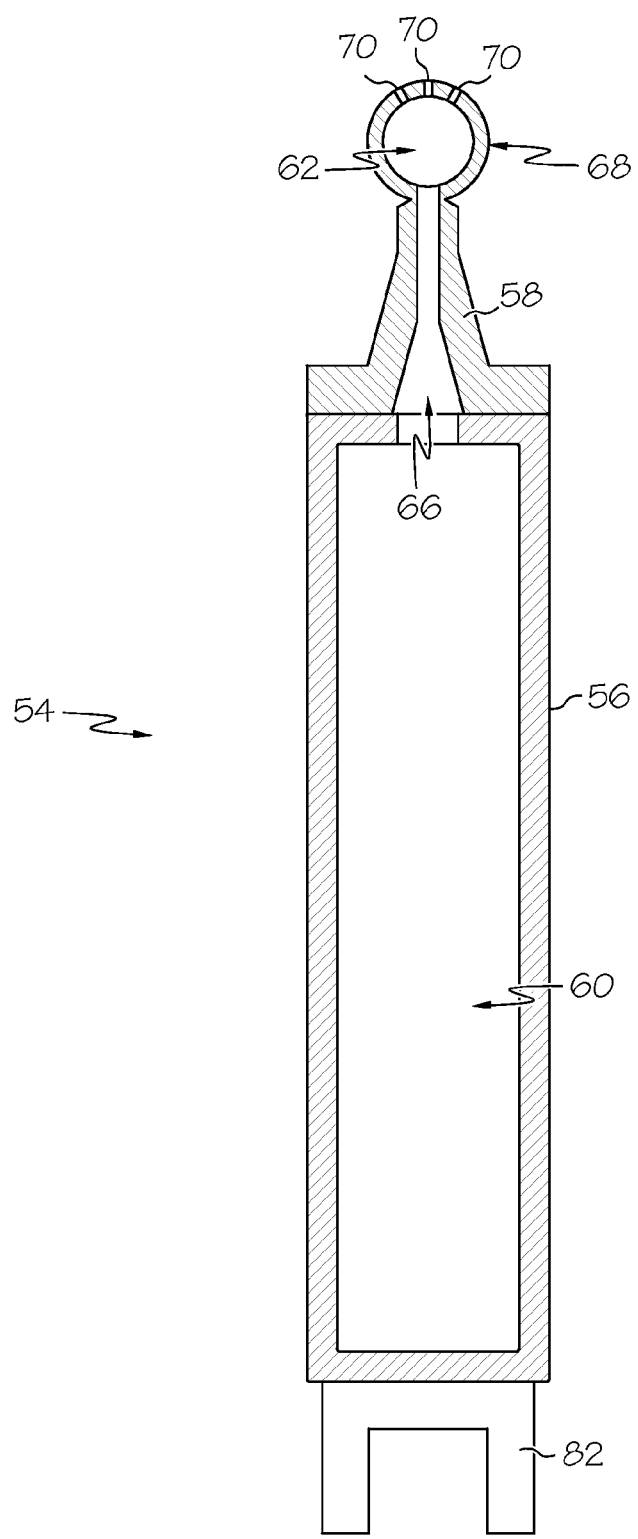
FIG. 6 is a sectional view of an example forming bar taken along line 6-6 of FIG. 5.

Turning briefly to FIG. 6, an example forming bar 54 of the plurality of flute forming bars 26 is illustrated in further sectional detail. It is to be understood that the following example can generally represent the plurality of flute forming bars 26, including both the upper and lower sets 50, 52, though some or all of the bars 26 can be different. The example forming bar 54 can include a main bar 56 supporting a corrugation bar 58 thereupon. The corrugation bar 58 can be coupled to the main bar 56 in various manners, including fasteners, adhesives, welding, and/or can even be formed therewith. Some or all of the corrugation bars 58 can extend partially or even completely along the longitudinal length of each forming bar 54. The main bar 56 and/or the corrugation bar 58 can have a generally hollow interior 60, 62, respectively, though either or both can also be generally solid. For example, the plurality of flute forming bars 26 can be extruded or gun drilled to provide the internal hollowed areas 60, 62 that can serve as a distribution manifold for the fluid injected through holes 70 acting as a lubricant in order reduce the frictional forces. In one example, the main bar 56 can include an end cap 64 or the like (see FIG. 5), and/or the corrugation bar 58 can include similar structure. The hollow interiors 60, 62 can be in fluid communication, such as through an internal portal 66 to permit a pressurized fluid, such as air or steam, to be delivered therebetween as will be discussed more fully.

The corrugation bar 58 is the portion that forms the longitudinal flutes in the web 22 passing through the first corrugating labyrinth 29. To that end, an upper portion of the corrugation bar 58 can include a generally rounded surface portion 68 for contact with the web 22. Turning briefly back to FIG. 5, the upper and lower sets 50, 52 of flute forming bars can be interdigitated so as to define the first corrugating labyrinth 29. That is, the generally rounded surface portion 68 of adjacent ones of the corrugation bars 58 of the upper and lower sets 50, 52 can be interlocked or intermeshed to define the first corrugating labyrinth 29, extending along the transverse length of the plurality of flute forming bars 26. In effect, the paperboard web 22 passing through the first labyrinth will alternatively pass over and under adjacent ones of the corrugation bars 58 to form the flutes.

A portion of the plurality of flute forming bars 26, such as all of the bars, include a surface adapted to contact the web of medium material, such as the generally rounded surface portion 68. The surface can include an anti-friction surface feature to thereby reduce the frictional forces on the web 22 as it is passing through the first corrugating labyrinth 29. In one example, a portion of the flute forming bars 26 can be zero-contact bars being operable to support said web of medium material 22 at a variable height thereabove on a cushion of air that is emitted through openings 70 provided over and through an outer surface 68 of the portion of the flute forming bars 26. Each surface portion 68 can include a plurality of openings 70 arranged variously thereon that can extend partially or completely along the length of a respective corrugation bar 58. Various numbers of openings 70 can be arranged variously, and only a portion are illustrated schematically.

Pressurized fluid, such as air, is delivered to a connector 72 or other delivery structure sealingly coupled to a portion of each individual forming bar 54. In one example, the connector 72 can be coupled to the main bar 56, though it can also be coupled to the corrugation bar 58. As shown, the connector 72 is coupled to the main bar 56 and the fluid is transferred to the surface 68 of the corrugation bar 58 via the portal 66. The connectors 72 of the various bars 58 can be directly (e.g., through a hose or the like) or indirectly (e.g., through a manifold or the like) to a fluid supply 74, in a serial or parallel configuration. The pressurized air then exits the corrugation bar 58 through the series of holes 70 spaced along the length of the rod 54 to provide the cushion of air for the paperboard web 22 to float on. The cushion of air provides air greasing (i.e., lubrication) that can reduce, such as eliminate, sliding frictional contact between the web 22 and the flute forming surface 68.

As with the guide roll 24, a volumetric flowrate of air at a controlled pressure is pumped from within each forming bar 54 radially outward through the small openings 70 or holes provided periodically and uniformly over and through the outer circumferential surface 68 of the corrugation bar 58. The result is that the passing web of medium material 22 is supported above the surface 68 by a cushion of air. Also as before, the zero-contact corrugation bar 58 can also provide an elegant mechanism for providing feedback control for the mean web tension via an active or passive pressure transducer (not shown) that can be used to detect the pressure in the air cushion. Because air cushion pressure and web tension are related according to the relation $P=T/R$ as noted above, monitoring the air cushion pressure, P, provides a real-time measure of the tension in the web. Again, "zero-contact" is not meant to imply there can never be any contact (i.e. literally "zero" contact) between the zero-contact bars 58 and the web, such as may occur, for example, due to transient or momentary fluctuations in mean web tension.

In addition or alternatively, the anti-friction surface feature of the surface portion 68 can include various other structure. In one example, surface portion 68 can be polished or electro polished in order reduce the frictional forces on the paper as it is passing through the first corrugating labyrinth 29. In another example, the surface portion 68 can be coated with a release or antifriction coating such as Teflon or similar in order reduce the frictional forces. In still another example, the surface portion 68 can be treated to create a hard surface coating such as provided by black oxide conversion coating, anodizing, flame spraying, deposition coatings, ceramic coating, chrome plating, or other similar surface treatments in order reduce the frictional forces.

For the following discussion, the standard flute size take-up factors will be used: Size A=1.56; size C=1.48; size B=1.36; size E=1.28; size F=1.19; and size N=1.15. However, it is to be appreciated that various other flute sizes can also be used. The following example will be discussed with reference to a standard "A" size flute take-up factor of 1.56 with a final paper width of 50 inches. Thus, the paper starting width is 78 inches (i.e., 50 inches×1.56), and each edge of the paper must move inwards towards the center approximately 14 inches (i.e., (78 inches−50 inches)/2) in order to properly form the flutes. Still, it is to be appreciated that various other web widths and/or take-up factors can also be used.

In order to condense the paperboard web 22 to achieve a desired take-up factors (e.g., to reduce the paperboard width from 78 inches to 50 inches or other desired width), the upper and lower sets of bars 50, 52 are brought gradually closer to each other symmetrically about the web centerline 25 so that each corrugation bar 58 causes the web to begin to form a large sinusoidal shape as the web floats frictionlessly over the bar surface 68. The forming bars 54 are angled relative to each other with the entrance end 38 of the bars 56 being relatively farther apart from each other than the exit end 40 of the bars 56. As a result, the complete sinusoidal shape of the flutes can develop gradually as the web travels down the length of the forming bars 54 so that abrupt tension changes in the web are reduced or eliminated as it is condensed inward.

The plurality of flute forming bars 26 can be adjusted so that any portion of the paper web 22 passing through the first corrugating labyrinth 29 is only curved over or around the radius of the generally rounded surface portion 68 of the corrugation bar 58, or at a maximum the next adjacent bar 58 to it, that the paper web starts on in order to reduce, such as minimize, the stress on the paper fibers. Thus, the paper web 22 is generally only bent once per flute as it travels through the first corrugating labyrinth 29, and such a partial bend should reduce damage, such as breakage, of the paper fibers.

Each set of forming bars is mounted in an adjustable framework that allows the individual bars to pivot in an accordion or fan-fold pattern so that the paperboard web is maintained generally parallel to the forming bars. Moreover, the adjustability of the segmented forming device permits various take-up ratios to be used for different flute sizes.

As shown in FIGS. 4-7, each of the forming bars 54 can be individually, pivotally fixed, such as at the exit end. Thus, each forming bar 54 can pivot independently of the other forming bars 54. In the shown example, each of the flute forming bars 54 are pivotally coupled, at an exit end 40 thereof, to a support frame 76, 78 such that the flute forming bars are movable laterally (i.e., non-machine-direction), at an entrance end 38 thereof, to individually adjust an angle of each of the flute forming bars 54 relative to the centerline 25 of the web to thereby form a fan of adjustable width. Each of the upper and lower sets 50, 52 can have separate support frames 76, 78 or can utilize a single support frame. Each of the forming bars 54 can be individually coupled to one of the support frames 76, 78 in various manners. In one example, as shown in FIG. 5, each forming bar 54 can include a pin 80, clevis, or other pivoting structure coupled to the main bar 56 and in pivotal engagement with a support frame 76, 78. Although described herein with reference to the bars 54 being pivotally coupled to the exit end, the opposite configuration can be utilized to pivotally couple the bars 54 about the entrance end and adjust the angle of the bars about the exit end thereof.

Figure 7:
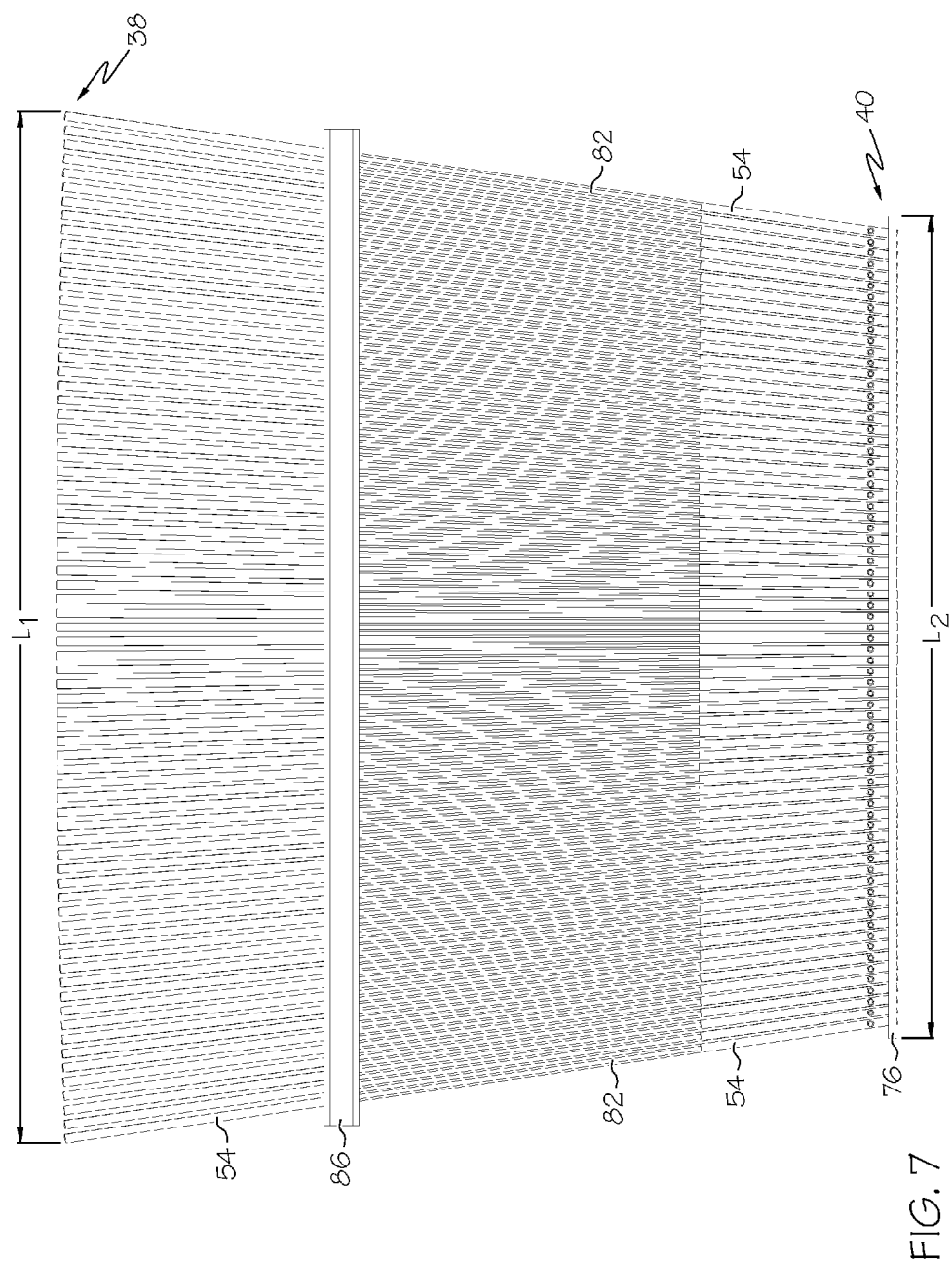
FIG. 7 is a top view of the example segmented forming device of FIG. 4 in a first arrangement.
Figure 8:
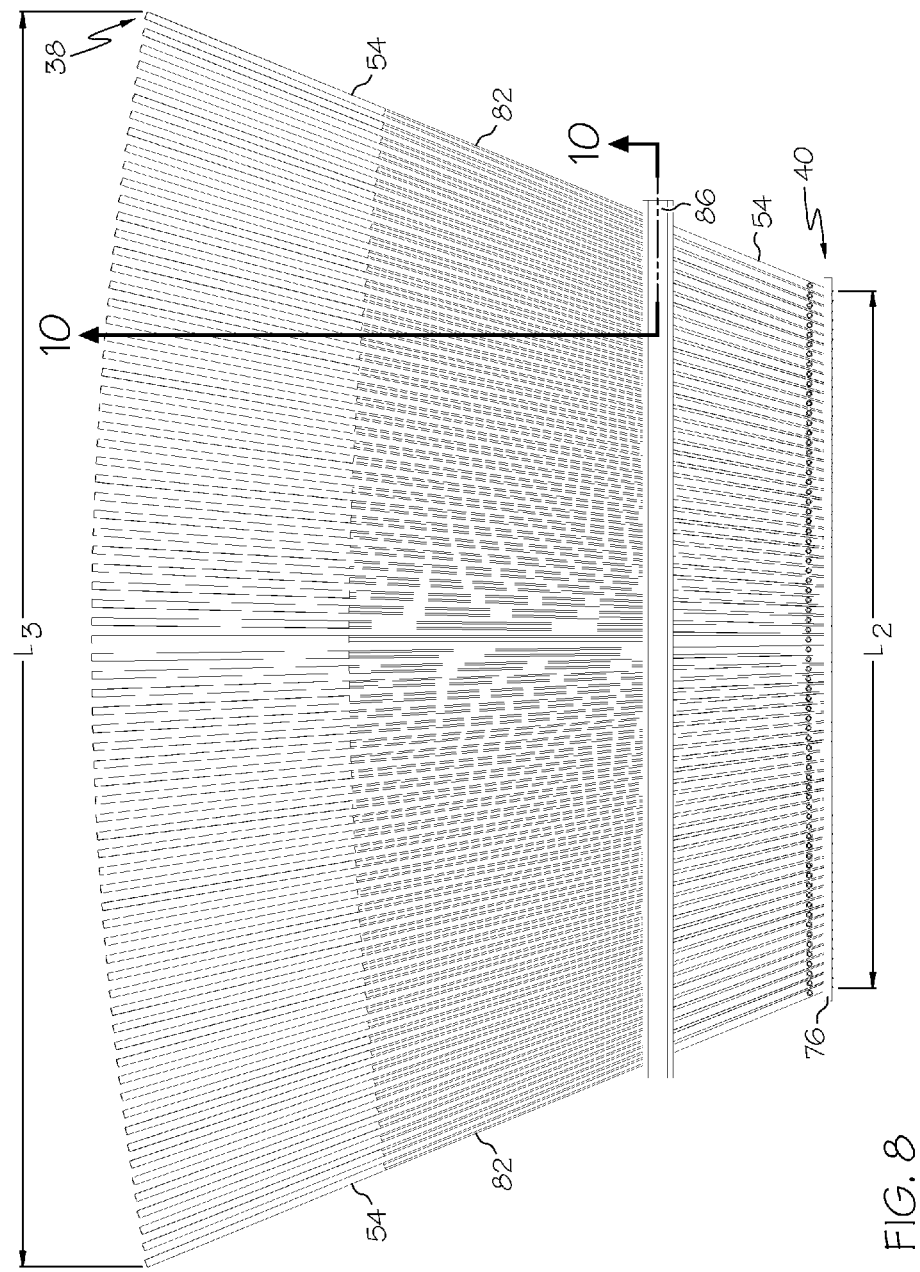
FIG. 8 is similar to FIG. 7, but shows the segmented forming device in a second arrangement.

FIGS. 7-8 illustrate two extreme examples of the adjustable width of the fan-like structure of the flute forming bars 54. As shown in FIG. 7, the entrance end 38 of the plurality of flute forming bars 26 has a first width $L_1$ that is arranged in the substantially narrowest position. That is, the first width $L_1$ illustrates the narrowest width of the entrance end 38 in the instant example. The exit end 40 of the plurality of flute forming bars 26 has a second width $L_2$. The second width $L_2$ illustrates the substantially final width of the web 22 upon exit from the first corrugating labyrinth 29. Turning to FIG. 8, the entrance end 38 of the plurality of flute forming bars 26 is now illustrated with a third width $L_3$ that is arranged in the substantially widest position. That is, the third width $L_3$ illustrates the widest width of the entrance end 38 in the instant example. However, because the plurality of flute forming bars 26 are pivotally fixed to the support frames 76, 78 about the exit end 40, the second width $L_2$ will remain substantially equal between the two extreme examples illustrated in FIGS. 7-8. Thus, while the web 22 can have various beginning widths, and the width of the entrance end 38 can be adjusted accordingly, the final width of the web 22 upon exit from the first corrugating labyrinth 29 can always be substantially equal to the second width $L_2$. It is to be understood that the two extreme examples illustrated in FIGS. 7-8 are illustrated as extreme examples, and the width of the entrance end 38 can be infinitely adjusted to any desired width therebetween. Still, though described as having one fixed width and one adjustable width end, it is to be understood that the width of each end 38, 40 of the segmented forming device can be configured to be separately and individually adjusted.

The forming bars 54 can include various structures for varying the width of the adjustable fan to a desired width between the two extreme examples illustrated in FIGS. 7-8. In one example, some or all of the forming bars 54 each include a guide track 82 that are coupled to cam rollers 84 of an adjusting framework for permitting the angular adjustment of the forming bars 54 to provide the fan-like or accordion effect as the cam rollers 84 travel back and forth along the guide tracks 82. As shown, the guide tracks 82 can be disposed generally midway along the length of the forming bars 54, though can also be disposed elsewhere or can even extend along substantially the entire length of the bars 54. Some or all of the cam rollers 84 can be coupled to an associated guide track 82 by a linear slide or the like. The cam rollers 84 can include rotatable structure to reduce, such as minimize, frictional contact with the guide tracks 82. In addition or alternatively, though described as cam "rollers" 84, the cams 84 can include static, non-rotational structure that may or may not include friction-reducing surface features, such as any described herein. The guide tracks 82 and cam rollers 84 can be a part of the adjusting framework. A single adjusting framework can be utilized to adjust both of the upper and lower sets 50, 52 of forming bars 54, or as shown in FIGS. 9-10, dual adjusting frameworks can be used to separately adjust the upper and lower sets 50, 52.

Figure 9:
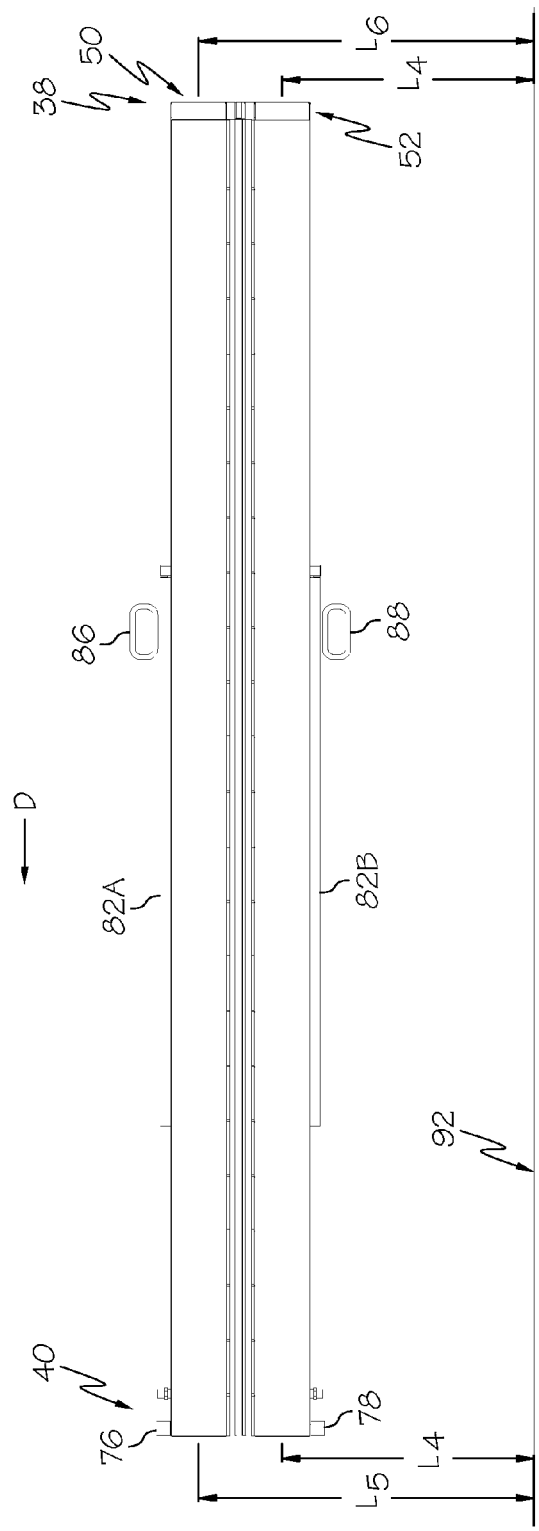
FIG. 9 is a side view of the segmented forming device of FIG. 4.
Figure 10:
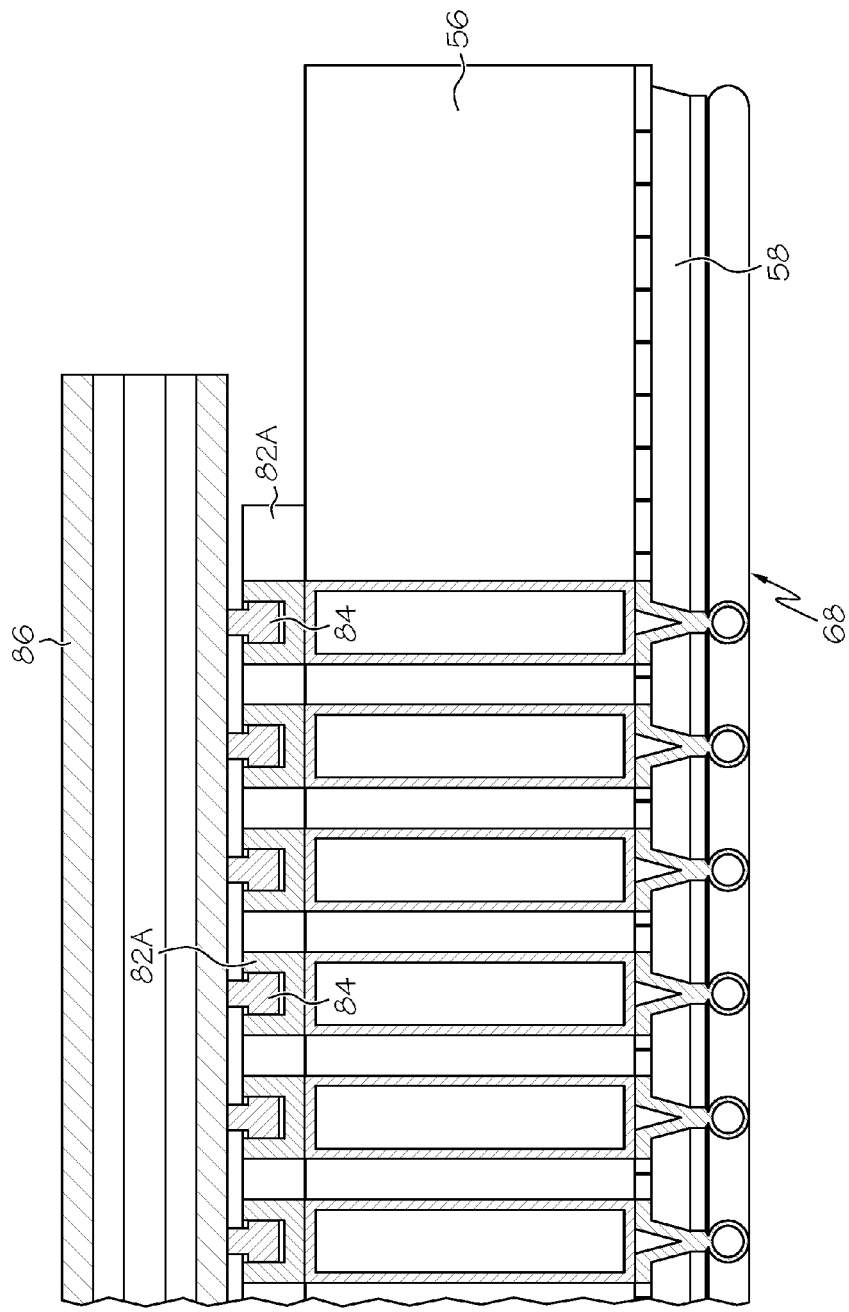
FIG. 10 partial sectional view of a portion of the segmented forming device taken along line 10-10 of FIG. 8.

Turning now to FIGS. 9-10, a plurality of upper guide tracks 82A can be each coupled to a respective one of the upper set 50 of flute forming bars 54. An upper framework 86 can extend laterally across at least a portion of the upper set 50 of flute forming bars 54 and can include a plurality of cams 84, such as stationary cams or even roller cams or the like, coupled thereto that are each arranged to be received within at least one upper guide track 82A. The cams 84 can be arranged variously, such as in an array or the like extending across the upper framework 86 that corresponds generally to the spacing of the plurality of upper guide tracks 82A. Thus, each roller cam 84 can be adapted to slide along the length of an associated upper guide track 82A. For brevity, only operation of the upper framework 86 is discussed herein with the understanding that the lower framework 88 can similarly operate.

The upper framework 86 can be movable along the longitudinal axis of the web 22, relative to the upper set of flute forming bars 54, between at least a first position located relatively closer to the entrance end 38 (i.e., corresponding to the first width $L_1$ of FIG. 7) and a second position located relatively closer to the exit end 40 (i.e., corresponding to the first width $L_3$ of FIG. 8). It is to be understood that the two extreme examples illustrated in FIGS. 7-8 are illustrated as extreme examples, and that the upper framework 86 can be longitudinally movable therebetween to infinitely adjust the width of the entrance end 38 to any desired width.

In the shown example, because the cams 84 are arranged in a generally fixed array on the upper framework 86, the cams 84 are not displaceable relative to the upper framework 86. That is, each cam 84 maintains a fixed distance relative to an adjacent cam 84. However, as described above, each of the forming bars 54 are pivotally coupled at the exit end 40 to the support frame 76. As a result, movement of the upper framework 86 along the longitudinal axis of the web 22 causes each of the cams 84 to apply a lateral force to each of the forming bars via the upper guide tracks 82A to thereby. Specifically, each individual forming bar 54 is laterally movable (i.e., non-machine-direction) a distance necessary to maintain an associated cam 84 within an associated upper guide track 82A to individually adjust an angle of each of the flute forming bars 54 relative to the centerline 25 of the web to thereby adjust the width of the fan. In other words, each individual forming bar 54 is forced to pivot at the exit end 40, and move laterally at the entrance end 38, until a distance between adjacent upper guide tracks 82A is substantially equal to the fixed distance between adjacent cams 84.

Thus, movement of the upper framework 86 towards the first position (i.e., FIG. 7) causes the upper set 50 of flute forming bars 54 to pivot generally towards the centerline 25 of the web 22 to thereby reduce the width of the fan (i.e., towards first width $L_1$). Similarly, movement of the upper framework 86 towards the second position (i.e., FIG. 8) causes the upper set 50 of flute forming bars 54 to pivot generally away from the centerline 25 of the web 22 to thereby increase the width of the fan (i.e., towards third width $L_3$).

Likewise, a plurality of lower guide tracks 82B can be each coupled to a respective one of the lower set 52 of flute forming bars 54. For brevity, only the upper framework 86 and associated structure is illustrated in FIG. 10, though it is to be understood that the lower framework 88 can include similar structure. That is, the lower framework 88 can extend laterally across at least a portion of the upper set 50 of flute forming bars 54, and can include a plurality of cams (not shown), such as stationary cams or even roller cams or the like, coupled thereto that are each arranged to be received within at least one lower track 82B.

The upper framework 86 can be movable along the longitudinal axis of the web 22, relative to the upper set of flute forming bars 54, between at least a first position located relatively closer to the entrance end 38 (i.e., corresponding to the first width $L_1$ of FIG. 7) and a second position located relatively closer to the exit end 40 (i.e., corresponding to the first width $L_3$ of FIG. 8), though is also longitudinally movable therebetween to infinitely adjust the width of the entrance end 38 to any desired width. As described above, each of the upper and lower frameworks 86, 88 can separately and independently adjust the width of the upper and lower sets 50, 52 of forming bars 54. In another example, the lower framework 88 can be operatively coupled to the upper framework 86, such as by various direct or indirect links 90 (shown schematically in FIG. 4) so as to be movable together therewith between the first and second positions of FIGS. 7-8. For example, movement of the upper framework 86 towards the second position can cause, via the link 90, both of the upper and lower sets 50, 52 of flute forming bars 54 to pivot generally away from the centerline 25 of the web 22 to thereby increase the width of the fan, or vice versa. In other examples, the lower framework 88 can be operatively coupled to the upper framework 86 directly or indirectly through a control system, such as via various motors, drive mechanisms, gearing, etc.

Moreover, a vertical distance or gap between the upper set 50 of forming bars 54 and the lower set 52 of forming bars can generally taper or decrease from the entrance end 38 to the exit end 40 to progressively form the corrugated geometry of the web 22. That is, a vertical distance between the upper and lower sets 50, 52 can be relatively greater about the entrance end 38, and relatively less about the exit end 40. As shown in FIG. 9, the vertical distances can be measured relative to a fixed reference point, such as a support surface 92 or the like. In the shown example, the difference ($L_6-L_4$) between the vertical distance $L_6$ of the upper set 50 and $L_4$ of the lower set 52, at the entrance end 38, can be relatively greater than the difference ($L_5-L_4$) between the vertical distance $L_5$ of the upper set 50 and $L_4$ of the lower set 52, at the exit end 40.

As shown, the lower set 52 can remain generally fixed vertically, such that the vertical distance $L_4$ can be generally equal between the support surface 92 and either end 38, 40. Thus, the tapering between the upper and lower sets 50, 52 can be accomplished by pivoting the upper set 50 relative to the lower set 52. Either or both ends 38, 40 of the upper set 50 can be pivotally adjustable relative to the lower set 52. In the shown example, the exit end 40 remains generally vertically fixed, while the entrance end 38 is vertically adjustable via pivoting of the upper set 50 generally about the exit end 40. Still, it is to be understood that either or both of the upper and lower sets 50, 52 can remain fixed or be vertically adjustable at either end. Thus, the tapering distance of the upper and lower sets 50, 52 permits the flute geometry to be formed from a relatively high amplitude, low frequency shape near the entrance end 38 to a relatively low amplitude, high frequency shape near the exit end 40, corresponding to the desired flute size.

Since the forming bars 54 are oriented at a relatively slight angle with respect to the web, there can be little or no tension force to be overcome by the anti-friction surface feature of the outer surface 68 of the forming bars 54. When the web exits the first corrugating labyrinth 29 of the flute forming bars 26, the web 22 is in a generally sinusoidal shape and can be substantially fully condensed in width (i.e., approximately 50 inches in the instant example). Still, various downstream corrugating elements may still further condense the width of the web 22.

In addition, the plurality of flute forming bars 26 can be adapted to be dynamically adjustable while the web of medium material is actively moving through the first corrugating labyrinth 29 so that a portion of the web 22 passing therethrough is maintained at a substantially constant web tension in a cross-machine direction. In one example, the width of the adjustable fan can be dynamically adjusted via the upper and lower frameworks 86, 88. In addition or alternatively, the vertical distance or gap between the upper and lower sets 50, 52 can be dynamically adjusted between the entrance end 38 to the exit end 40.

Each of the dynamic adjustments can be performed manually, semi-automatically, or even fully automatically. In one example, an automatic control system can be provided with motors, drive mechanisms, gearing, sensors, and positional feedback on some or all of the movable adjustments. In response to signals from these sensor(s), the automatic control system can utilize an open or closed feedback control loop as known in the art to regulate the operation of the apparatus 20. It is recognized that an iterative process of trial and error may be desirable to discover optimal adjustment values. In another example, a feedforward control loop could even be used so the control system can anticipate changes in incoming medium material and make appropriate corrections. In another example, the control system can be interconnected with a pressure transducer of one of the guide roll 24 or forming bars 54 or elsewhere to dynamically determine web tension. Such a fully automatic control system can reduce, such as minimize changeover time between products having different web widths and/or desired corrugated geometry.

Figure 11:
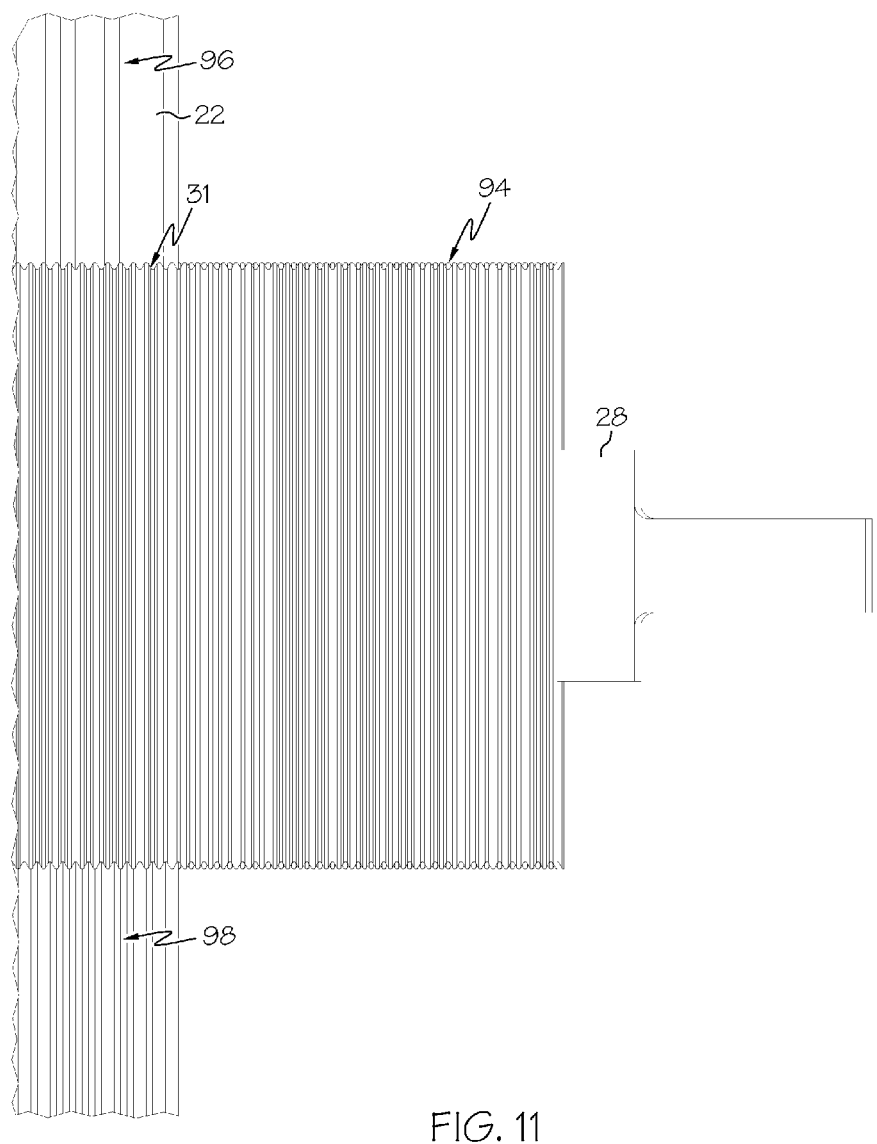
FIG. 11 is a partial detail view of an example corrugating roller of FIG. 1.
Figure 12:
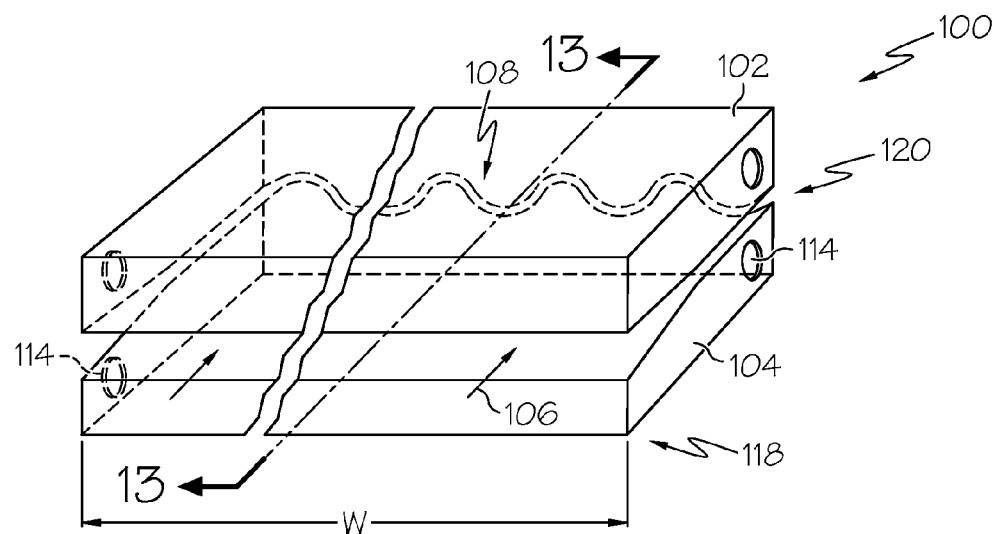
FIG. 12 is a perspective view of an example fixed forming device.
Figure 13:
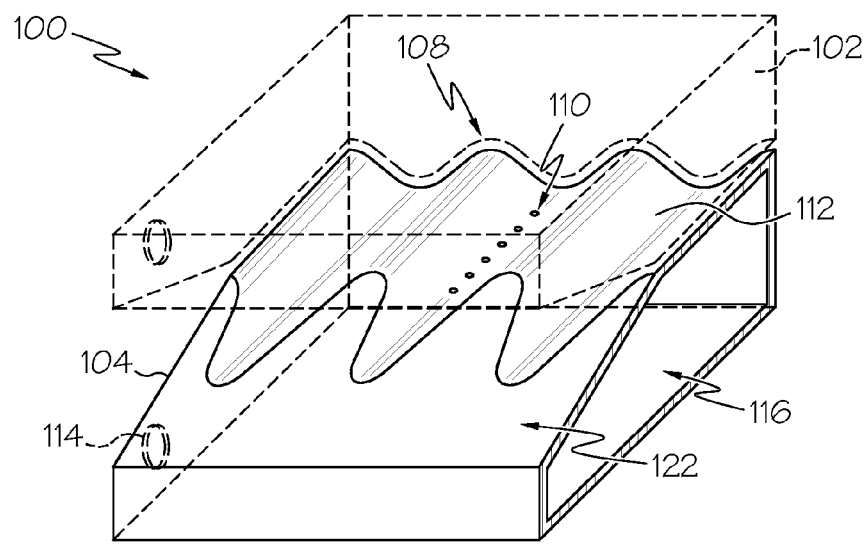
FIG. 13 is a partial sectional view of the fixed forming device taken along line 13-13 of FIG. 12.

Moving downstream and turning to FIGS. 1-2 and 11, a pair of corrugating rollers 28, 30 define a second corrugating labyrinth 31. More specifically, the pair of corrugating rollers 28, 30 cooperate to define, at a nip therebetween, the second corrugating labyrinth 31 between respective and interlocking pluralities of corrugating teeth 94 provided on the corrugating rollers 28, 30. The pluralities of corrugating teeth 94 are arranged cylindrically along the longitudinal length of each of the rollers 28, 30 so as to longitudinally corrugate the web 22 passing through the second labyrinth 31. The interlocking pluralities of corrugating teeth 94 receive an intermediate flute geometry 96 (i.e., such as the output of the first or third corrugating labyrinths), and are effective to longitudinally corrugate, to a substantially final flute geometry 98, the web 22 of medium material that is drawn through the nip on rotation of the corrugating rollers 28, 30. That is, as shown, the second corrugating labyrinth 31 can be the final structure for longitudinally corrugating the web 22 to a final, desired flute geometry.

The corrugating rollers 28, 30 are mounted adjacently and cooperate with each other, such that the web 22 passes through the nip and is compressed therebetween. Both the rollers 28, 30 are journaled for rotation on respective substantially parallel axes, and together they define a substantially serpentine or sinusoidal pathway or corrugating labyrinth 31 at the nip between them. For example, as with the first corrugating labyrinth 29, the teeth 94 of the rollers 28, 30 can be interdigitated to define the second corrugating labyrinth 31. That is, the second corrugating labyrinth 31 is produced by a first set of cylindrically arranged corrugating teeth 94 disposed along the longitudinal length of one roller 28 that are received within the valleys defined between a second set of cylindrically arranged corrugating teeth (not shown) disposed along the longitudinal length of the other roller 30, and vice versa. Both sets of teeth 94 are provided so that individual teeth span the full length of the respective rolls 28, 30, or at least the width of the web 22 that traverses the second corrugating labyrinth 31 therebetween, so that full-width corrugations can be produced in that web 22 as the teeth 94 interlock with one another at the nip as the rolls rotate.

The corrugating rollers 28, 30 are rotated in opposite angular directions such that the web of medium material 22 is drawn through the nip, and is forced to negotiate the second corrugating labyrinth 31 defined between the opposing and interlocking sets of corrugating teeth 94. On exiting the nip (and corrugating labyrinth 31), as will be understood by those of ordinary skill in the art the medium material 22 has a corrugated form in a substantially final geometry; i.e. a substantially serpentine longitudinal cross-section having opposing flute peaks and valleys on opposite sides or faces of the medium material 22. Additionally, precise downstream tension control also can be selected by adjusting the radial velocity (and correspondingly the surface linear velocity) of the corrugating rollers 28, 30.

The apparatus 20 can further include additional structure. Turning now to FIGS. 1-2 and 12-13, a fixed forming device 100 can be disposed between the plurality of flute forming bars 26 and the pair of corrugating rollers 28, 30. The fixed forming device 100 can define a third corrugating labyrinth 106 effective to longitudinally corrugate, to a near-final geometry, the web 22 of medium material that is drawn therethrough. The elements of the fixed forming device 100 have a width W and remain generally fixed, such that the width W is generally not adjustable. Thus, there may be little, such as zero, transverse movement of the web 22 passing through the fixed forming device 100. Instead, the final width of the web 22 can remain generally constant before and after the fixed forming device 100, while the height of the flutes is further reduced towards a final flute geometry. A vertical height between the elements can be adjustable, or may also be non-adjustable. Because the elements of the fixed forming device 100 can be non-adjustable, different sets of elements may be removed and replaced for each desired web width and/or final desired corrugated flute geometry. In other cases, the fixed forming device 100 may not be used, such as where a desired web with exceeds the maximum width W of the device 100. Where a fixed forming device is used 100, the web travel pathway for the medium material can thereby follow a path around a portion of an outer circumferential surface of the guide roll, through the first corrugating labyrinth, through the third corrugating labyrinth, and finally through the second corrugating labyrinth.

Thus, unlike the segmented forming device, which has an adjustable forming angle to accommodate different flute take up ratios, the fixed forming device 100 can have a fixed flute forming geometry. To accommodate various flute sizes, the fixed forming device 100 can be suitably replaced, along with the downstream corrugating rolls 28, 30. The fixed flute forming device 100 can include two machined shapes that have the large sinusoidal pattern at the entry end, and the final flute pattern at the exit end. The two machined shapes are generally similar, and are positioned above and below the paperboard web.

More specifically, the fixed forming device 100 can include an upper die 102 disposed above the web 22 of medium material and a lower die 104 disposed below the web 22 of medium material. The upper and lower dies 102, 104 can each include fixed flute-forming teeth 108 that are interdigitated so as to define the third corrugating labyrinth 106. That is, a generally rounded surface portion of adjacent teeth 108 of the upper and lower dies 102, 104 can be interlocked or intermeshed to define the third corrugating labyrinth 106, extending along the transverse width W of the fixed forming device 100. In effect, the paperboard web 22 passing through the third labyrinth 106 will alternatively pass over and under adjacent ones of the teeth 108 to form the flutes to a near-final geometry that can be further refined downstream by the rollers 28, 30.

The surface of the upper and lower dies 102, 104 can include an anti-friction surface feature to thereby reduce the frictional forces on the web 22 as it is passing through the third corrugating labyrinth 106. In one example, a portion of the upper and lower dies 102, 104 can include zero-contact structure being operable to support said web of medium material 22 at a variable height thereabove on a cushion of air that is emitted through openings 110 provided over and through an outer surface 112 of the portion of the upper and lower dies 102, 104. A plurality of openings 110 can be arranged variously thereon that can extend partially or completely along the width W of a respective upper and lower die 102, 104.

The upper and lower dies 102, 104 can be zero-contact surfaces being operable to support the web of medium material at a variable height above their surface 112 on a cushion of fluid (i.e., air or steam) that is emitted through the openings 110. The air cushion provides air greasing (i.e., lubrication) that can reduce, such as eliminate, sliding frictional contact between the web 22 and the teeth 108. The pressurized fluid, such as air, can delivered to one or more openings 114 sealingly coupled to a portion of the upper and lower dies 102, 104. The openings 114 can be directly or indirectly in fluid communication with the openings 110, such as via an open manifold 116 disposed within an interior of the upper and lower dies 102, 104. Again, "zero-contact" is not meant to imply there can never be any contact (i.e. literally "zero" contact) between the zero-contact surface and the web, such as may occur, for example, due to transient or momentary fluctuations in mean web tension.

In addition or alternatively, the anti-friction surface feature of the surface 112 of the upper and lower dies 102, 104 can include various other structure. In one example, surface portion 112 can be polished or electro polished in order reduce the frictional forces on the paper as it is passing through the third corrugating labyrinth 106. In another example, the surface portion 112 can be coated with a release or antifriction coating such as Teflon or similar in order reduce the frictional forces. In still another example, the surface portion 112 can be treated to create a hard surface coating such as provided by black oxide conversion coating, anodizing, flame spraying, deposition coatings, ceramic coating, chrome plating, or other similar surface treatments in order reduce the frictional forces.

The two patterns of the fixed flute forming device 100 can be blended together (e.g., lofted) so that as the paperboard web passes between the upper and lower dies 102, 104 the sinusoidal shape transitions gradually corresponding to the desired flute size. Since the transition is gradual and the forces applied to the web are generally parallel to the tension force of the paperboard web, there is little or no damage to the web. More specifically, a vertical distance or gap between the upper and lower dies 102, 104 can generally taper or decrease from an entrance end 118 to an exit end 120 to progressively form the corrugated geometry of the web 22. That is, a vertical distance between the upper and lower dies 102, 104 can be relatively greater about the entrance end 118, and relatively less about the exit end 120. The tapering can be accomplished by a ramped geometry 122 on either or both of the upper and lower dies 102, 104. Still, it is to be understood that either or both of the upper and lower dies 102, 104 can remain fixed or even be vertically adjustable. Thus, the tapering distance of the upper and lower dies 102, 104 permits the flute geometry to be formed from a relatively high amplitude, low frequency shape near the entrance end 118 to a relatively low amplitude, high frequency shape near the exit end 120, corresponding to the desired flute size.

The web exits the fixed forming device 100 at a near net shape so that as it passes through the downstream corrugating rolls 28, 30, there are little or no stretching forces or tension spikes applied to the web by the corrugating rolls 28, 30. As discussed above, the downstream corrugating rolls 28, 30 can each have a fluted geometry similar to that of the fixed forming device 100 for maintaining, or even further refining, the final flute shape. As a result, this process can significantly reduce the strength reduction undergone by the paperboard web in comparison to a conventional process, which can see tension spikes as high as 400% of running tension.

Moving downstream from the final corrugating rollers 28, 30 and turning now to FIGS. 1-2 and 14-16, the web 22 of material can be further processed in various manners. In one example, a final corrugating roll 130 can have a similar fluted geometry as the corrugating rollers 28, 30, while a single-face roller 132, such as a pressure roll, can be used to apply a face sheet 134 to the corrugated webbing 22 to form a single-faced corrugated board 136. In addition or alternatively, one or more further rollers (not shown) can apply other face sheets (not shown), such as to form a double-faced corrugated board (not shown). Alternatively, the corrugated web 22 alone can be stored or otherwise processed.

Figure 14:
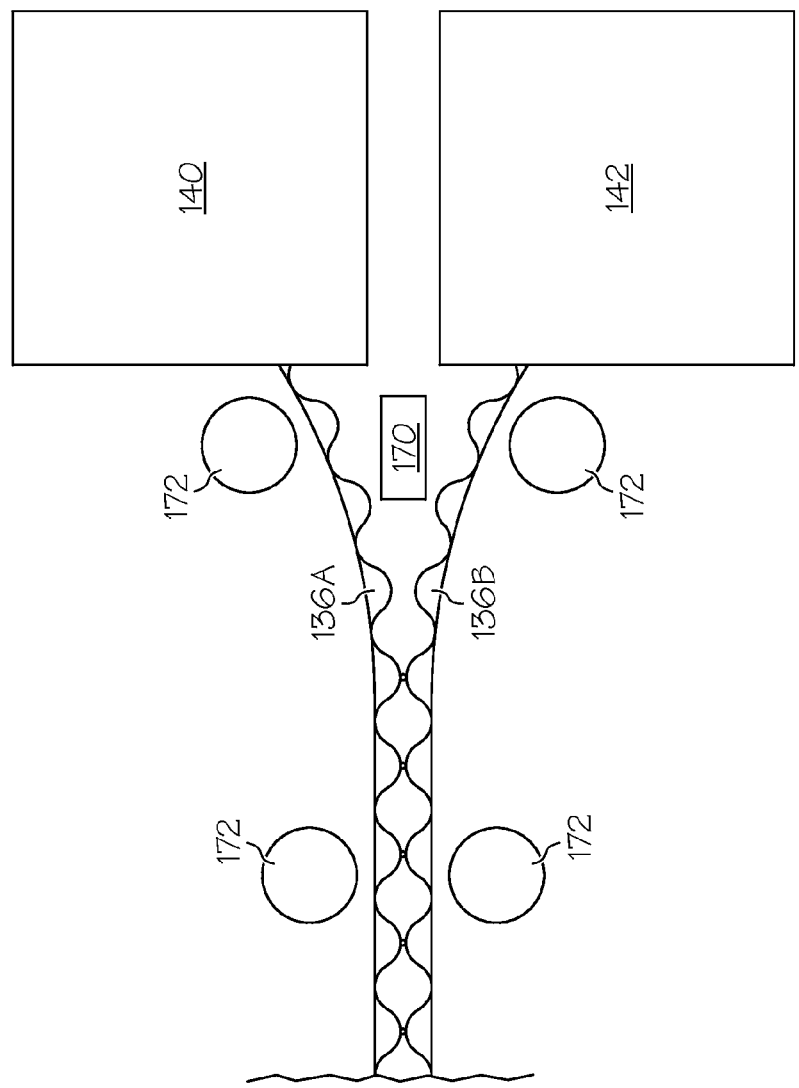
FIG. 14 is a schematic view of an example arrangement for forming an example multi-layer corrugated panel.

The single-faced corrugated board 136 produced by the apparatus 20 can be stored or otherwise further utilized in the manufacturing process. In addition or alternatively, the single-faced corrugated board 136 can be continuously formed into a double/triple/quadruple, etc. wall design to increase strength. For example, as shown in the schematic view of FIG. 14, a first single-faced sheet 136A can be produced by a first apparatus 140 (i.e., similar to the apparatus 20) while a second single-faced sheet 136B can be produced by a second apparatus 142 (i.e., also similar to the apparatus 20). Thus, each of the first and second apparatuses 140, 142 can each produce similar linearly corrugated board, and may even be vertically arranged as shown. It is to be understood that FIG. 14 is illustrated schematically, and as such the single-faced sheets 136A, 136B are illustrated in a manner to demonstrate the concepts discussed herein. In actual operation, the flutes of the single-faced sheets 136A, 136B would extend longitudinally from the machines 140, 142 (i.e., in the machine direction). The first and second single-faced sheets 136A, 136B produced thereby can be coupled together in various manners for form various double wall designs. Vertical arrangement of two apparatuses 140, 142 can facilitate forming either of the panels 150, 160 discussed below because such an arrangement can provide increased registration accuracy between the single-faced sheets 136A, 136B. While single-faced sheets are discussed, it is to be understood that various other styles can be used (i.e., double/triple faced sheets) to form various double/triple/quadruple, etc. wall designs.

Figure 15:
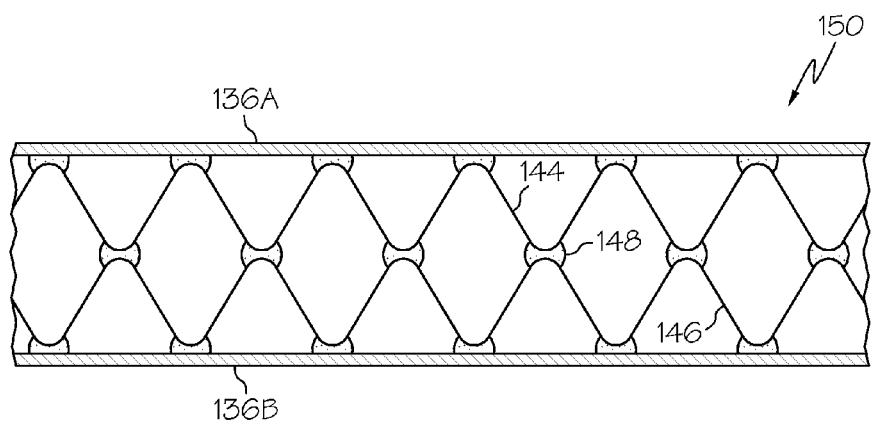
FIG. 15 is a partial side view of an example multi-layer corrugated panel that includes a flute-to-flute bond structure.

In one example, as schematically shown in FIG. 15, the first and second single-faced sheets 136A, 136B produced thereby can be coupled together to continuously form a single multi-layer corrugated panel 150, with the two single-faced sheets 136A, 136B being bonded together at the flute tips. That is, the flutes 144 of the first single-faced sheet 136A can be bonded directly to the flutes 146 of the second single-faced sheet 136B, at the flute tips, by various glues/adhesives 148. Thus, a flute-to-flute bond (e.g., an "X" flute) that can eliminate an interior double wall.

Figure 16:
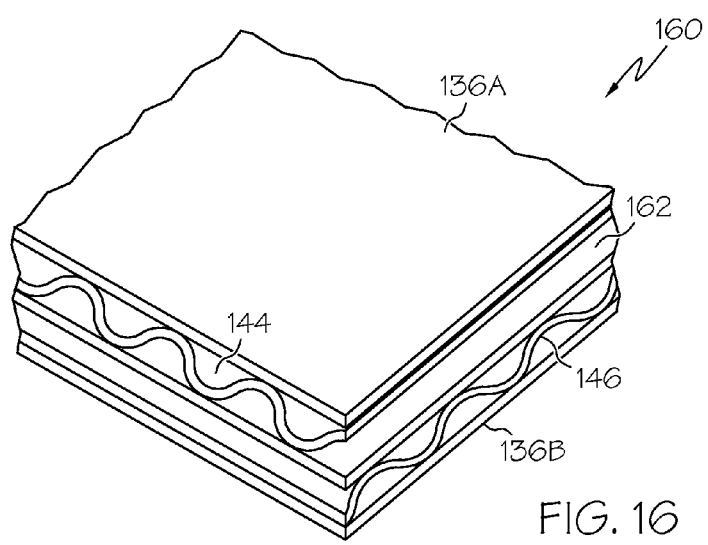
FIG. 16 is a partial side view of another example multi-layer corrugated panel that includes a cross flute, double wall design.

In another example, as schematically shown in FIG. 16, the first and second single-faced sheets 136A, 136B produced thereby can be coupled together to continuously form a single multi-layer corrugated panel 160, with the two single-faced sheets 136A, 136B being arranged at an angle relative to each other. For example, in the shown example, the two single-faced sheets 136A, 136B are arranged generally perpendicular relative to each other (i.e., flutes 144 are generally perpendicular to flutes 146), though various other angles can also be used. An interior wall 162 can be disposed between the two single-faced sheets 136A, 136B by various glues/adhesives. Thus, a cross flute, double wall design 160 can be formed to increase strength. That is, each flute layer can be oriented at an angle relative to adjacent layers to provide strength across multiple force vectors.

Returning briefly to FIG. 14, various structures can be used to create the structures of FIGS. 15-16. For example, one or more interior elements 170 can apply adhesive to the flute tips to form the flute-to-flute panel 150. In another example, the interior element 170 can apply the interior layer 162 and/or adhesives to form the cross-flute panel 160. In addition or alternatively, various rollers 172 or the like can guide the two single-faced sheets 136A, 136B, and/or can even be utilized as pressure rolls to apply one of the sheets 136A to the other sheet 136B. Moreover, it is to be understood that the individual single-faced sheets 136A, 136B need not be formed using the same process or apparatus, and that various types of sheets can be bonded together.

The corrugation apparatus 20 and process of the instant application can provide some highly beneficial results, including but not limited to the following: (1) The process significantly reduces the strength reduction undergone by the paperboard web in comparison to a conventional process, which can see tension spikes as high as 400% of running tension; (2) Double wall strength can be equal to or greater than current triple wall or triple wall made with vastly reduced basis weight; (3) Triple wall can be equal to or greater than current 4-wall or 4-wall made with vastly reduced basis weight; (4) Laminated 4- or 5-wall board with two cross flute sections would be very strong or could be made with vastly reduced basis weight; (5) Increased burst strength even at lower basis weights due to the liner applicator applying a continuous film to the liners; and (6) The possibility to add moisture resistance to the liners since the adhesive can be applied as a continuous film.

Various other corrugation techniques can also be used with the aforedescribed linear fluting apparatus 20 and process to further increase the strength of the corrugated board. For example, the corrugated board can be formed with a cold adhesive (e.g., at or near room temperature) such that little or no drying energy can be required. In addition or alternatively, the cold adhesive can be applied as a relatively thin film that bonds to the corrugation by pressure pulses as it exits the single facer.

It is to be understood that the names given to specific stages of a corrugating apparatus 20 herein are intended merely for convenience and ease of reference for the reader, so he/she can more easily follow the present description and the associate drawings. It is in no way intended that each of these stages or 'machines' must be a single, discreet or unitary machine or device, or that specific elements need to be provided together or in close association with the other elements described herein with respect to a particular stage or 'machine.' It is contemplated that various elements of the disclosed corrugating apparatus 20 can be rearranged, or located in association with the same or different elements as herein described.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An apparatus for producing a longitudinally corrugated product, including: an upper set of flute forming bars and a lower set of flute forming bars, said upper and lower sets of flute forming bars each comprising respective pluralities of flute forming bars oriented generally along a machine direction of said apparatus, said upper and lower sets of flute forming bars being interdigitated to define a first corrugating labyrinth effective to longitudinally corrugate a web of medium material that is drawn through said first corrugating labyrinth along a web-travel pathway in the machine direction, and a guide roll for guiding the web of medium material into said first corrugating labyrinth, wherein at least a portion of the guide roll is adapted to be arranged at an angle relative to another portion of the guide roll such that a path length of an edge portion of the web is shortened relative to a path length of a center portion of the web after leaving the guide roll, and wherein ones of said flute forming bars approach a centerline of said web-travel pathway along the machine direction when viewed from above said pathway, wherein as the web of medium material is actively moving through said first corrugating labyrinth a degree of interdigitation between said upper and lower sets of flute forming bars is uniformly adjustable adjacent an exit end of said first corrugating labyrinth into a range of fixed relative positions to thereby define respective predetermined lateral take-up widths for the web of medium material.

2. The apparatus of claim 1, wherein the flute forming bars are pivotally coupled, at an exit end thereof, to a support frame such that the flute forming bars are movable laterally, at an entrance end thereof, to individually adjust an angle of each of the flute forming bars relative to said centerline to thereby form a fan of adjustable width.

3. The apparatus of claim 1, wherein the upper and lower sets of flute forming bars become progressively more interdigitated in the machine direction along partial lengths thereof.

4. The apparatus of claim 1, wherein a portion of the plurality of flute forming bars include a surface adapted to guide a web of medium material, the surface including an anti-friction surface feature to thereby reduce frictional forces on the web as the web is passing through the first corrugating labyrinth.

5. The apparatus of claim 4, wherein portions of the flute forming bars are zero-contact bars operable to support a web of medium material traveling through said first corrugating labyrinth at a variable height above said bars on a cushion of air that is emitted through openings provided in outer surfaces thereof.

6. The apparatus of claim 1, wherein the guide roll includes at least a first segment defining a first longitudinal axis coupled to an end of a second segment defining a second longitudinal axis, at least one of the first and second segments being movable relative to the other of the first and second segments such that the first axis is oriented at an angle relative to the second axis.

7. The apparatus of claim 6, wherein each of the first and second segments are movable relative to each other, the first axis being pivotable to a first angle relative to the centerline of the web and the second axis being pivotable to a second angle substantially equal and opposite the first angle.

8. The apparatus of claim 1, wherein the guide roll is a zero-contact roll being operable to support the web of medium material at a variable height above an outer circumferential surface of the guide roll on a cushion of air that is emitted through openings provided over and through the outer circumferential surface of the guide roll.

9. The apparatus of claim 1, further including a pair of corrugating rollers disposed downstream of said first corrugating labyrinth along said web-travel pathway in the machine direction, said pair of corrugating rollers cooperating to define, at a nip therebetween, a second corrugating labyrinth between respective and interlocking pluralities of circumferential corrugating teeth provided on the corrugating rollers, wherein said interlocking pluralities of corrugating teeth are effective to longitudinally corrugate, to a substantially final geometry, a web of medium material that is drawn through said nip on rotation of the corrugating rollers.

10. An apparatus for producing a longitudinally corrugated product, including a guide roll, a first set of flute forming bars and a second, opposing set of flute forming bars, said first and second sets of flute forming bars together defining a first corrugating labyrinth effective to introduce longitudinal corrugations in a web of medium material traveling therethrough along a web travel pathway in a machine direction, said guide roll being adapted to guide the web of medium material into said first corrugating labyrinth, wherein at least a portion of the guide roll is adapted to be arranged at an angle relative to another portion of the guide roll such that a path length of an edge portion of the web is shortened relative to a path length of a center portion of the web after leaving the guide roll, and wherein a pair of adjacent flute forming bars in said first set thereof approach one another along said web-travel pathway in the machine direction, wherein as the web of medium material is actively moving through said first corrugating labyrinth a degree of interdigitation between said first and second sets of flute forming bars is uniformly adjustable adjacent an exit end of said first corrugating labyrinth into a range of fixed relative positions to thereby define respective predetermined lateral take-up widths for the web of medium material.

11. The apparatus of claim 10, said first and second sets of flute forming bars being interdigitated along partial lengths thereof so as to define the first corrugating labyrinth.

12. The apparatus of claim 11, wherein the first and second sets of flute forming bars become progressively more interdigitated in the machine direction along said partial lengths thereof.

13. The apparatus of claim 12, said flute forming bars comprising openings in respective surfaces thereof configured to emit a fluid for supporting a web traveling through said first corrugating labyrinth at a distance spaced from said surfaces.

14. The apparatus of claim 10, further comprising a fixed forming device defining a second corrugating labyrinth located downstream from said first corrugating labyrinth along said web-travel pathway in the machine direction, said second corrugating labyrinth being configured to receive the web of medium material into which have been introduced first longitudinal corrugations by said first corrugating labyrinth, and to introduce therein second longitudinal corrugations having a higher frequency than said first corrugations measured in a lateral direction of said web.

15. The apparatus of claim 14, wherein the fixed forming device includes an upper die and a lower die, the upper and lower dies each including fixed flute-forming teeth that are interdigitated so as to define the second corrugating labyrinth.

16. The apparatus of claim 15, wherein at least one of the upper and lower dies includes a surface having an anti-friction surface feature to thereby reduce the frictional forces on the web as the web is passing through the second corrugating labyrinth.

17. The apparatus of claim 10, each of said flute forming bars being linear when viewed from above.

18. The apparatus of claim 10, wherein the guide roll includes at least a first segment defining a first longitudinal axis coupled to an end of a second segment defining a second longitudinal axis, at least one of the first and second segments being movable relative to the other of the first and second segments such that the first axis is oriented at an angle relative to the second axis.

19. The apparatus of claim 18, wherein each of the first and second segments are movable relative to each other, the first axis being pivotable to a first angle relative to a centerline of the web and the second axis being pivotable to a second angle substantially equal and opposite the first angle.

20. The apparatus of claim 10, wherein the guide roll is a zero-contact roll being operable to support the web of medium material at a variable height above an outer circumferential surface of the guide roll on a cushion of air that is emitted through openings provided over and through the outer circumferential surface of the guide roll.

21. The apparatus of claim 10, said flute forming bars comprising openings in respective surfaces thereof configured to emit a fluid for supporting a web traveling through said first corrugating labyrinth at a distance spaced from said surfaces.

22. An apparatus for producing a longitudinally corrugated product, including a first set of flute forming bars and a second, opposing set of flute forming bars, said first and second sets of flute forming bars being interdigitated along at least partial lengths thereof to define a first corrugating labyrinth effective to introduce longitudinal corrugations in a web of medium material traveling therethrough along a web travel pathway in a machine direction, wherein as the web of medium material is actively moving through said first corrugating labyrinth a degree of interdigitation between said first and second sets of flute forming bars is uniformly adjustable adjacent an exit end of said first corrugating labyrinth into a range of fixed relative positions to thereby define respective predetermined lateral take-up widths for the web of medium material.

23. The apparatus of claim 22, wherein the first and second sets of flute forming bars become progressively more interdigitated in the machine direction along said at least partial lengths thereof.

24. The apparatus of claim 23, said flute forming bars comprising openings in respective surfaces thereof configured to emit a fluid for supporting a web traveling through said first corrugating labyrinth at a distance spaced from said surfaces.

25. The apparatus of claim 22, further comprising a second corrugating labyrinth located downstream from said first corrugating labyrinth along said web-travel pathway in the machine direction, said second corrugating labyrinth being configured to receive a web of medium material into which have been introduced first longitudinal corrugations by said first corrugating labyrinth, and to introduce therein second longitudinal corrugations having a higher frequency than said first corrugations measured in a lateral direction of said web.

26. The apparatus of claim 22, said flute forming bars comprising openings in respective surfaces thereof configured to emit a fluid for supporting a web traveling through said first corrugating labyrinth on a fluid cushion at a distance spaced from said surfaces, and a pressure transducer configured to detect a pressure of the fluid cushion.

* * * * *